United States Patent
Biskeborn

(10) Patent No.: US 11,783,857 B2
(45) Date of Patent: Oct. 10, 2023

(54) DATA STORAGE SYSTEM AND MAGNETIC TAPE RECORDING MEDIA WITH FEATURES FOR CORRECTING THE COMBINED EFFECTS OF TAPE SKEW AND TAPE DIMENSIONAL STABILITY

(71) Applicant: International Business Machines Corporation, Armonk, NY (US)

(72) Inventor: Robert Biskeborn, Hollister, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/115,637

(22) Filed: Dec. 8, 2020

(65) Prior Publication Data

US 2022/0180897 A1 Jun. 9, 2022

(51) Int. Cl.
*G11B 5/56* (2006.01)
*G11B 5/584* (2006.01)
(Continued)

(52) U.S. Cl.
CPC ............ *G11B 5/56* (2013.01); *G11B 5/00817* (2013.01); *G11B 5/2652* (2013.01); *G11B 5/29* (2013.01);
(Continued)

(58) Field of Classification Search
None
See application file for complete search history.

(56) References Cited

U.S. PATENT DOCUMENTS

| 3,760,802 A | 9/1973 | Fischer et al. |
| 5,021,906 A | 6/1991 | Chang et al. |
| 5,055,951 A | 10/1991 | Behr |
| 5,450,257 A | 9/1995 | Tran et al. |

(Continued)

FOREIGN PATENT DOCUMENTS

| WO | 9950834 A1 | 10/1999 |
| WO | 2004102538 A3 | 11/2004 |

(Continued)

OTHER PUBLICATIONS

Cherubini et al., "High-Rate Skew Estimation for Tape Systems," ScienceDirect, IFAC—PapersOnLine, 2016, pp. 7-12.

(Continued)

*Primary Examiner* — Craig A. Renner
(74) *Attorney, Agent, or Firm* — Zilka-Kotab, P.C.

(57) ABSTRACT

An apparatus according to one approach includes an array of skew detection transducers. An array of write transducers is spaced from the array of skew detection transducers along an intended direction of tape travel thereacross. An array of read transducers is aligned with the array of write transducers in the intended direction of tape travel. The apparatus also includes a first actuator configured to operatively exert a force on the array of skew detection transducers for orienting a longitudinal axis of the array of skew detection transducers substantially orthogonal to the actual direction of tape travel across the array of skew detection transducers. A magnetic recording medium according to one approach includes a magnetic recording tape having a longitudinal axis extending between distal ends thereof, the magnetic recording tape having vertical bars written in servo-skew patterns thereof, the vertical bars being oriented perpendicular to the longitudinal axis of the tape.

25 Claims, 26 Drawing Sheets

(51) Int. Cl.
  *G11B 5/29*   (2006.01)
  *G11B 20/20*  (2006.01)
  *G11B 5/48*   (2006.01)
  *G11B 5/008*  (2006.01)
  *G11B 5/265*  (2006.01)
  *G11B 5/53*   (2006.01)
  *G11B 5/55*   (2006.01)

(52) U.S. Cl.
  CPC .......... *G11B 5/4893* (2013.01); *G11B 5/584* (2013.01); *G11B 20/20* (2013.01); *G11B 5/531* (2013.01); *G11B 5/5508* (2013.01); *G11B 5/5539* (2013.01)

(56) References Cited

U.S. PATENT DOCUMENTS

| | | |
|---|---|---|
| 5,636,088 A | 6/1997 | Yamamoto et al. |
| 5,982,592 A | 11/1999 | Saito et al. |
| 6,188,532 B1 | 2/2001 | Albrecht et al. |
| 6,222,698 B1 | 4/2001 | Barndt et al. |
| 6,236,525 B1 | 5/2001 | Cates et al. |
| 6,246,552 B1 | 6/2001 | Soeno et al. |
| 6,330,123 B1 | 12/2001 | Schwarz et al. |
| 6,545,837 B1 | 4/2003 | Tran |
| 6,611,399 B1 | 8/2003 | Mei et al. |
| 6,690,535 B2 | 2/2004 | Wang |
| 6,700,729 B1 | 3/2004 | Beck et al. |
| 6,751,042 B2 | 6/2004 | Bi et al. |
| 6,757,128 B2 | 6/2004 | Yip |
| 6,771,456 B2 | 8/2004 | Winarski et al. |
| 6,781,784 B2 | 8/2004 | Peterson |
| 7,054,097 B1 | 5/2006 | Yip et al. |
| 7,068,473 B2 | 6/2006 | O'Neill |
| 7,110,210 B2 | 9/2006 | Saliba et al. |
| 7,153,366 B1 | 12/2006 | Chen et al. |
| 7,187,515 B2 | 3/2007 | Saliba |
| 7,239,465 B1 | 7/2007 | Watson et al. |
| 7,301,724 B2 | 11/2007 | Brittenham |
| 7,307,809 B2 | 12/2007 | Neumann |
| 7,342,738 B1 | 3/2008 | Anderson et al. |
| 7,359,160 B2 | 4/2008 | Koga et al. |
| 7,391,587 B2 | 6/2008 | Dugas et al. |
| 7,393,066 B2 | 7/2008 | Dugas et al. |
| 7,414,811 B2 | 8/2008 | Biskeborn |
| 7,474,495 B2 | 1/2009 | Weng et al. |
| 7,480,117 B2 | 1/2009 | Biskeborn et al. |
| 7,486,464 B2 | 2/2009 | Saliba |
| 7,505,221 B2 | 3/2009 | Watson |
| 7,529,060 B2 | 5/2009 | Simmons, Jr. et al. |
| 7,570,450 B2 | 8/2009 | Koeppe |
| 7,602,579 B2 | 10/2009 | Biskeborn et al. |
| 7,675,710 B2 | 3/2010 | Hennecken et al. |
| 7,724,465 B2 | 5/2010 | Koeppe |
| 7,738,212 B2 | 6/2010 | Saliba et al. |
| 7,764,460 B2 | 7/2010 | Bates et al. |
| 7,766,236 B2 | 8/2010 | Biskeborn et al. |
| 7,782,564 B2 | 8/2010 | Biskeborn et al. |
| 7,787,203 B2 | 8/2010 | Biskeborn et al. |
| 7,889,454 B2 | 2/2011 | Johnson et al. |
| 8,054,576 B2 | 11/2011 | Bui et al. |
| 8,089,716 B2 | 1/2012 | Takayama et al. |
| 8,094,402 B2 | 1/2012 | Bui et al. |
| 8,144,424 B2 | 3/2012 | Dugas et al. |
| 8,184,394 B2 | 5/2012 | Poorman et al. |
| 8,254,058 B2 | 8/2012 | Biskeborn |
| 8,310,778 B2 | 11/2012 | Biskeborn et al. |
| 8,432,635 B2 | 4/2013 | Fasen |
| 8,724,250 B2 | 5/2014 | Poorman et al. |
| 8,773,810 B2 | 7/2014 | Biskeborn et al. |
| 8,780,486 B2 | 7/2014 | Bui et al. |
| 8,797,682 B1* | 8/2014 | Biskeborn et al. ........................ G11B 5/00826 360/121 |
| 8,804,270 B2 | 8/2014 | Hamidi et al. |
| 9,019,651 B2 | 4/2015 | Bui et al. |
| 9,171,563 B1 | 10/2015 | Biskeborn |
| 9,177,580 B1 | 11/2015 | Vanderheyden et al. |
| 9,183,878 B2 | 11/2015 | Cherubini et al. |
| 9,251,825 B2 | 2/2016 | Biskeborn et al. |
| 9,300,284 B2 | 3/2016 | Biskeborn et al. |
| 9,633,681 B1 | 4/2017 | Cherubini et al. |
| 9,653,114 B1 | 5/2017 | Biskeborn et al. |
| 9,892,751 B1 | 2/2018 | Harper |
| 9,947,354 B1 | 4/2018 | Harper |
| 10,199,060 B2 | 2/2019 | Biskeborn |
| 10,297,275 B2 | 5/2019 | Biskeborn et al. |
| 10,332,554 B1 | 6/2019 | Bui et al. |
| 10,354,679 B2 | 7/2019 | Biskeborn et al. |
| 10,395,682 B2 | 8/2019 | Harper |
| 2002/0163752 A1* | 11/2002 | Peterson ................ G11B 5/584 360/76 |
| 2003/0095353 A1 | 5/2003 | Nakao |
| 2003/0227702 A1 | 12/2003 | Watson et al. |
| 2004/0109261 A1 | 6/2004 | Dugas |
| 2004/0120070 A1* | 6/2004 | Ito ........................ G11B 5/584 360/76 |
| 2005/0134989 A1 | 6/2005 | Girvin et al. |
| 2005/0259364 A1 | 11/2005 | Yip |
| 2006/0103968 A1 | 5/2006 | Jurneke |
| 2006/0126212 A1 | 6/2006 | Anderson et al. |
| 2007/0047142 A1 | 3/2007 | Biskeborn |
| 2007/0047146 A1 | 3/2007 | Biskeborn et al. |
| 2007/0285831 A1 | 12/2007 | Goker et al. |
| 2008/0030886 A1 | 2/2008 | Biskeborn et al. |
| 2008/0137235 A1 | 6/2008 | Biskeborn et al. |
| 2008/0158720 A1 | 7/2008 | Watson |
| 2008/0186610 A1 | 8/2008 | Bui et al. |
| 2008/0218891 A1 | 9/2008 | Gubbins et al. |
| 2008/0239559 A1 | 10/2008 | Goker et al. |
| 2008/0291566 A1 | 11/2008 | Biskeborn et al. |
| 2009/0073603 A1 | 3/2009 | Koeppe |
| 2009/0109566 A1 | 4/2009 | Tanaka et al. |
| 2009/0213493 A1 | 8/2009 | Bui et al. |
| 2010/0067139 A1 | 3/2010 | Bates et al. |
| 2010/0177436 A1 | 7/2010 | Bui et al. |
| 2010/0214688 A1 | 8/2010 | Biskeborn et al. |
| 2011/0141604 A1 | 6/2011 | Dugas et al. |
| 2011/0199701 A1 | 8/2011 | Bui et al. |
| 2011/0199703 A1 | 8/2011 | Hansen et al. |
| 2012/0188665 A1 | 7/2012 | Biskeborn et al. |
| 2012/0206832 A1 | 8/2012 | Hamidi et al. |
| 2014/0016226 A1* | 1/2014 | Bui et al. ................ G11B 5/584 360/76 |
| 2014/0327983 A1* | 11/2014 | Biskeborn et al. .... G11B 5/584 360/70 |
| 2014/0327987 A1* | 11/2014 | Biskeborn et al. .... G11B 5/584 360/76 |
| 2015/0043101 A1 | 2/2015 | Biskeborn et al. |
| 2015/0062741 A1* | 3/2015 | Biskeborn et al. .... G11B 5/584 360/48 |
| 2015/0062742 A1* | 3/2015 | Biskeborn et al. .... G11B 5/584 360/51 |
| 2015/0170691 A1* | 6/2015 | Biskeborn et al. .... G11B 5/584 360/71 |
| 2015/0279396 A1* | 10/2015 | Biskeborn et al. .... G11B 5/584 360/76 |
| 2016/0019921 A1* | 1/2016 | Bui et al. ................ G11B 5/584 360/76 |
| 2017/0372735 A1 | 12/2017 | Biskeborn |
| 2018/0122412 A1* | 5/2018 | Harper .................. G11B 5/584 |

FOREIGN PATENT DOCUMENTS

| | | |
|---|---|---|
| WO | 2005057554 A1 | 6/2005 |
| WO | 2010044784 A1 | 4/2010 |
| WO | 2011112181 A9 | 9/2011 |

OTHER PUBLICATIONS

Pantazi et al., "Skew estimation and feed-forward control in flangeless tape drives," 6th IFAC Symposium on Mechatronic Systems

(56) References Cited

OTHER PUBLICATIONS

The International Federation of Automatic Control, Apr. 10-12, 2013, pp. 484-489.
Harper D., U.S. Appl. No. 15/336,641, filed Oct. 27, 2016.
Non-Final Office Action from U.S. Appl. No. 15/336,641, dated Dec. 23, 2016.
Final Office Action from U.S. Appl. No. 15/336,641, dated Jul. 7, 2017.
Notice of Allowance from U.S. Appl. No. 15/336,641, dated Sep. 29, 2017.
Supplemental Notice of Allowance from U.S. Appl. No. 15/336,641, dated Dec. 12, 2017.
Harper D., U.S. Appl. No. 15/802,344, filed Nov. 2, 2017.
Non-Final Office Action from U.S. Appl. No. 15/802,344, dated Sep. 20, 2018.
Final Office Action from U.S. Appl. No. 15/802,344, dated Mar. 19, 2019.
Notice of Allowance from U.S. Appl. No. 15/802,344, dated Apr. 24, 2019.
Wang et al., "Approaches to Tilted Magnetic Recording for Extremely High Areal Density," IEEE Transactions of Magnetics, vol. 39, No. 4, 2003, pp. 1930-1935.
Lim et al., "Perpendicular Magnetic Recording Process Using Finite-Element Micromagnetic Simulation," IEEE Transactions on Magnetics, vol. 42, No. 10, 2006, pp. 3213-3215.
Biskeborn et al., U.S. Appl. No. 13/010,731, filed Jan. 20, 2011.
Hamidi et al., U.S. Appl. No. 13/026,142, filed Feb. 11, 2011.
Biskeborn et al., U.S. Appl. No. 15/273,508, filed Sep. 22, 2016.
Biskeborn, R., U.S. Appl. No. 16/879,578, filed May 20, 2020.
Argumedo et al., "Scaling tape-recording, densities to 100 GB/in2," IBM Journal of Research and Development, vol. 52, No. 4/5, Jul./Sep. 2008, pp. 513-527.
Biskeborn, R. G., U.S. Appl. No. 16/553,013, filed Aug. 27, 2019.
Non-Final Office Action from U.S. Appl. No. 16/553,013, dated Feb. 6, 2020.
Final Office Action from U.S. Appl. No. 16/553,013, dated May 13, 2020.
Biskeborn, R. G., U.S. Appl. No. 16/405,589, filed May 7, 2019.
Restriction Requirement from U.S. Appl. No. 16/405,589, dated Nov. 26, 2019.
Non-Final Office Action from U.S. Appl. No. 16/405,589, dated Feb. 12, 2020.
Feldman et al., "Shingled Magnetic Recording Areal Density Increase Requires New Data Management," usenix File Systems, login:, vol. 38, No. 3, Jun. 2013, pp. 22-30.
He et al., "SMaRT: An Approach to Shingled Magnetic Recording Translation," 15th USENIX Conference on File and Storage Technologies, 2017, pp. 121-133.
Bui et al., U.S. Appl. No. 17/107,578, filed Nov. 30, 2020.
International Search Report and Written Opinion from PCT Application No. PCT/EP2021/082874, dated Feb. 25, 2022.

\* cited by examiner

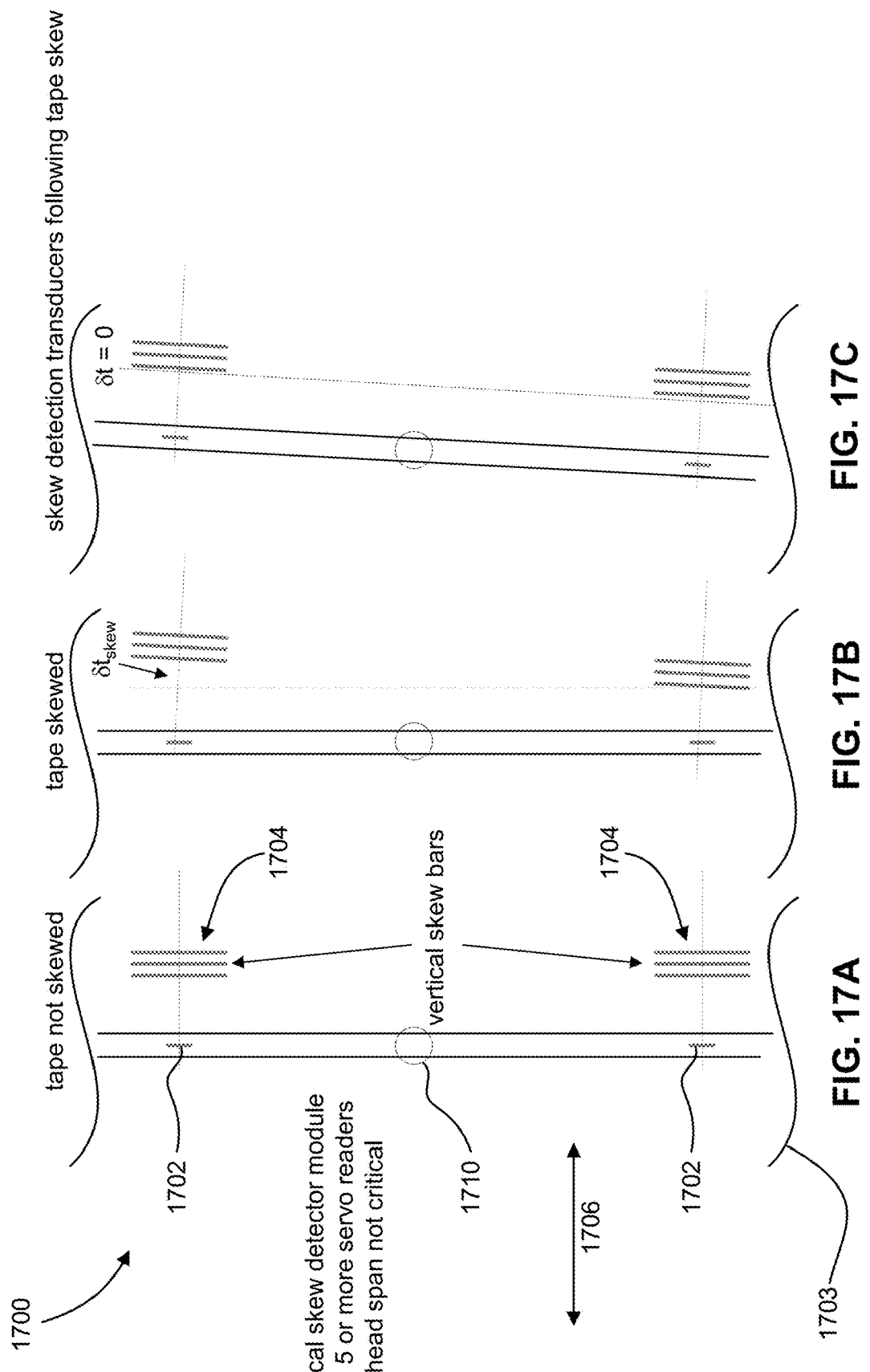

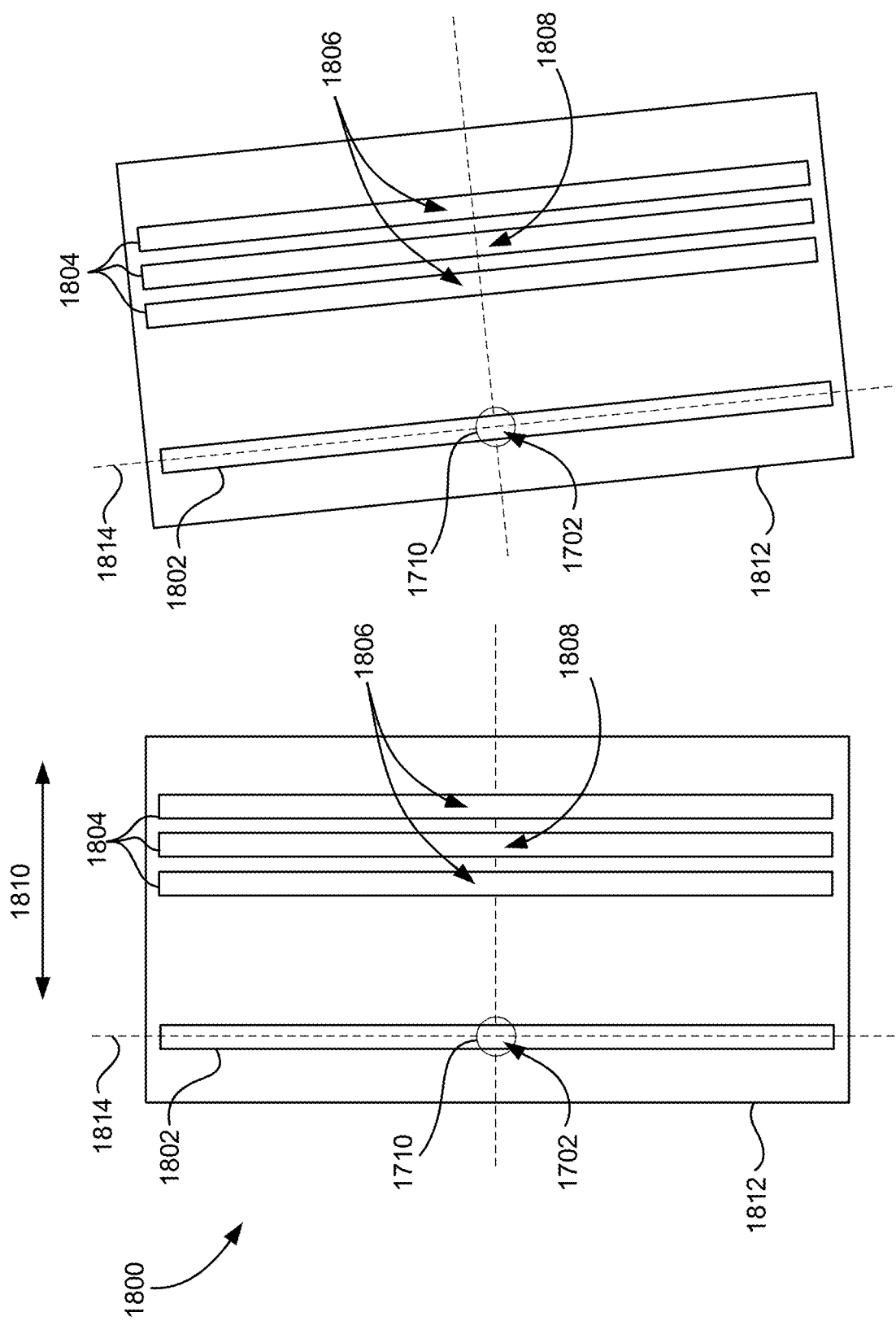

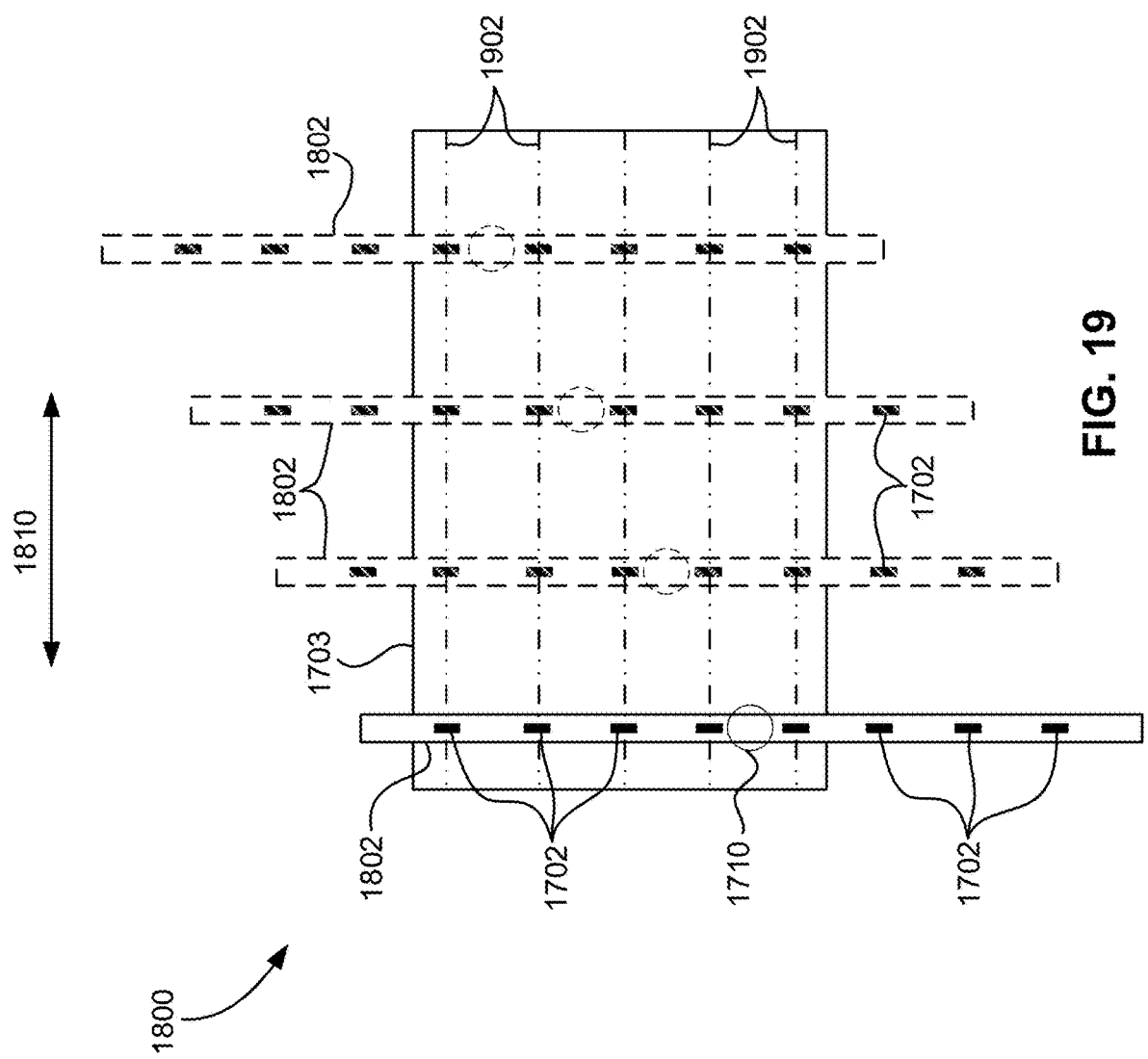

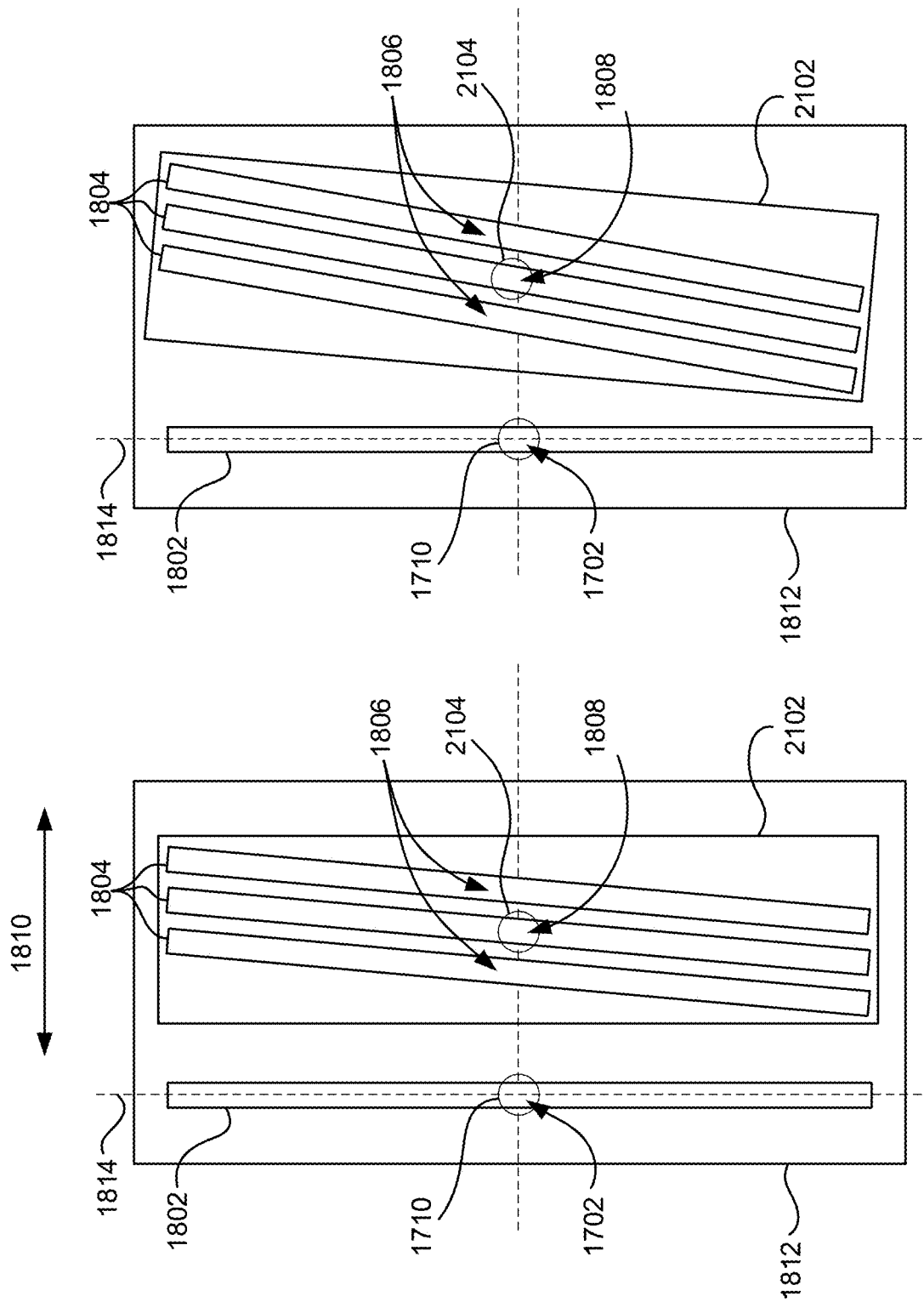

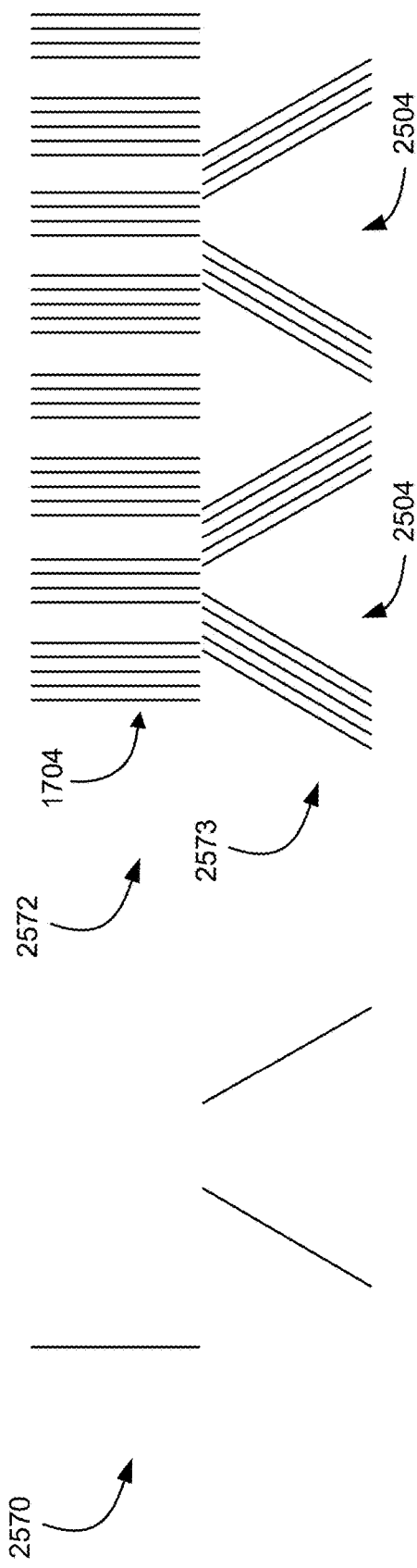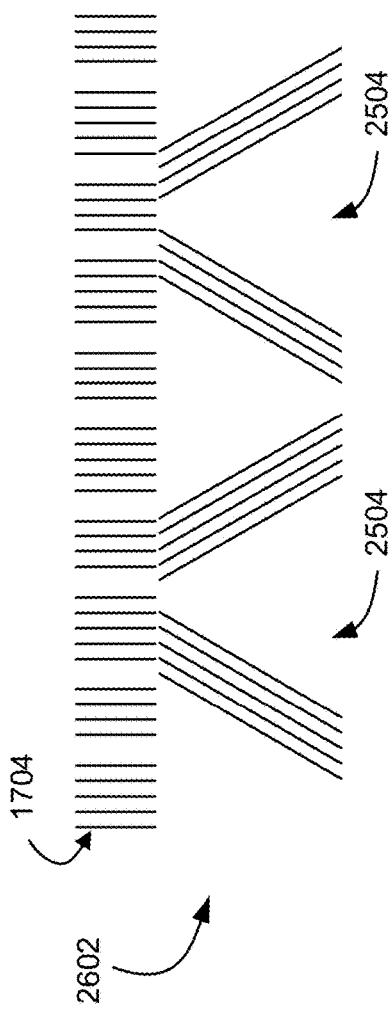

DATA STORAGE SYSTEM AND MAGNETIC TAPE RECORDING MEDIA WITH FEATURES FOR CORRECTING THE COMBINED EFFECTS OF TAPE SKEW AND TAPE DIMENSIONAL STABILITY

BACKGROUND

The present invention relates to data storage systems, and more particularly, this invention relates to tape-based data storage systems having the ability to correct for the combined effects of tape skew and tape dimensional stability.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, the drive moves the magnetic tape over the surface of the tape head at high speed. Usually the tape head is designed to minimize the spacing between the head and the tape. The spacing between the magnetic head and the magnetic tape is crucial and so goals in these systems are to have the recording gaps of the transducers, which are the source of the magnetic recording flux in near contact with the tape to effect writing sharp transitions, and to have the read elements in near contact with the tape to provide effective coupling of the magnetic field from the tape to the read elements.

The quantity of data stored on a magnetic tape may be expanded by increasing the number of data tracks across the tape. More tracks are made possible by reducing feature sizes of the readers and writers, such as by using thin-film fabrication techniques and magnetoresistive (MR) sensors. However, for various reasons, the feature sizes of readers and writers cannot be arbitrarily reduced, and so factors such as tape skew, lateral tape motion (e.g., perpendicular to the direction of tape travel), transients and tape lateral expansion and contraction must be balanced with reader/writer sizes that provide acceptable written tracks and readback signals.

As alluded to in the previous paragraph, one issue limiting areal density is misregistration caused by tape skew. As tape is being run over the surface of a tape head, angular shifts in the relative angular relationship between an array of transducers and the data tracks on the tape may occur, typically resulting in misregistration of the transducers from the data tracks of the tape. Skew-induced misregistration tends to be more pronounced on smaller tracks. Accordingly, data may not be readable from a tape, particularly as the tape capacity increases over time and tracks become smaller.

Another particular problem limiting areal density is misregistration caused by tape lateral expansion and contraction, commonly referred to as poor tape dimensional stability (TDS), or more properly, tape dimensional instability (TDI).

Tape lateral contraction and expansion is a well-known phenomenon that occurs due to a plethora of effects, including absorption of water, thermal expansion and contraction, etc. Tape width can vary by up to about 0.1% due to TDS/TDI.

When the dimensions of the tape change, various issues arise. During writing, the likelihood of overwriting shingled tracks increases. Overwritten data is often unrecoverable. Likewise, where the width of the tape has changed since the desired data was written, the readers may no longer be positioned over the tracks to be read, increasing reading errors. The extent of misregistration is particularly prevalent toward outer ends of the reader array.

More permanent changes in media lateral dimensions may also occur, such as long-term media "creep" (also known in the art as "aging"), which tends to occur over time when a tape is wound around a hub of a tape cartridge. Long-term media creep is particularly problematic when dealing with tape dimensional stability issues, as the two ends of the tape exhibit creep in different ways. The inner wraps of tape positioned closest to the cartridge hub tend to expand laterally over time due to the compressive stresses exerted thereon by the wraps of tape wound around them. Wraps positioned toward the outer diameter of the spool of tape are under less compressive stress, but are under higher tensile stresses, which tends to cause lateral contraction of the tape, i.e., the tape becomes narrower over time. Accordingly, the ends of the tape tend to exhibit oppositely-oriented lateral dimensional changes. It follows that shingled track pitch changes over time due to creep, and to different extents (non-uniformly) along the length of the tape.

Thus, while the width of the transducer array is essentially fixed (absent tilting or other mechanism to adjust the transducer spacing presented to tape), the spacing of the data tracks on the tape will vary as the tape expands and contracts. Ideally, the reader track width would be as wide as the data track being read; this would provide the best signal. However, sensor track widths cannot be made as wide as the data tracks, because the sensors would read adjacent tracks upon expansion or contraction of the tape and/or due to lateral misregistration between tape and head. Accordingly, reader widths are currently designed to be substantially smaller than the data track width, and all readers in a given head have the same track width. The reader track width is selected to accommodate the worst-case scenarios, i.e., the designer takes into account maximum expansion/contraction and lateral misregistration when determining reader track width so that each sensor is over a given track at any time.

A prior attempt at compensating for TDS issues included statically tilting the magnetic head to adjust the transducer pitch presented to tape to meet the current track pitch. The tilt was adjusted as needed to provide the proper apparent transducer pitch. However, such attempt was found to be prone to track placement errors caused by skewing of the tape during writing and reading. For example, in a tape drive, it is well known that tape skews as it passes over the heads in both directions of tape motion. If not compensated for, the skew may cause a micron or more of track placement error, which is more than present day singled track pitch.

Another related problem with tilting approaches is related to read verify while writing, which requires the trailing read transducers to remain in the envelope of the just-written tracks as they are being written. Read and write arrays are offset when the heads are assembled to set the read transducers nominally in line with the writers for the target static tilt angle. However, small corrections to the tilt to accommodate dimensional changes of the tape require using wider-than-otherwise-needed write poles to ensure the readers stay within the read-while-write envelope. Wider writers in turn create write head design issues such as requiring more coil turns, etc., and independently results in reduced achievable tape areal capacity due to space used by the last unshingled tracks written in each sub-databand. This can create as much as 20-30% capacity reduction.

What is needed is a solution to the foregoing problems, thereby enabling future areal density growth.

SUMMARY

The apparatuses and methods presented herein address difficulties encountered when attempting to increase the storage density on magnetic tape media while maintaining a high data rate per unit of tape speed.

An apparatus according to one aspect of the present invention includes an array of skew detection transducers. An array of write transducers is spaced from the array of skew detection transducers along an intended direction of tape travel thereacross. An array of read transducers is aligned with the array of write transducers in the intended direction of tape travel. The apparatus also includes a first actuator configured to operatively exert a force on the array of skew detection transducers for orienting a longitudinal axis of the array of skew detection transducers substantially orthogonal to the actual direction of tape travel across the array of skew detection transducers.

This orientation results in virtually no misregistration or distortion as a result of tape lateral expansion or contraction, because the orientation of the array of skew detection transducers is parallel to the direction of tape lateral expansion or contraction. Moreover, this orientation renders the array of skew detection transducers immune to pitch variations between the skew detection transducers.

In some approaches, the array of skew detection transducers is on a first module, and the arrays of read and write transducers are on at least one second module that is movable relative to the first module. The first actuator is configured to move the first and the at least one second module together. A second actuator is configured to exert a force on the at least one second module for causing a relative movement of the at least one second module with respect to the first module for adjusting a tilt angle of the at least one second module in response to a determined state of lateral expansion of the tape. Such approach enables compensation for both skew and TDS issues.

An apparatus according to another aspect of the present invention includes a first module having an array of skew detection transducers. An array of write transducers is spaced from the array of skew detection transducers along an intended direction of tape travel thereacross. An array of read transducers is aligned with the array of write transducers in the intended direction of tape travel. The arrays of read and write transducers are on at least one second module. The at least one second module is movable relative to the first module. A first actuator is configured to move the first and the at least one second module together. A second actuator is configured to exert a force on the at least one second module for causing a relative movement of the at least one second module with respect to the first module for adjusting a tilt angle of the at least one second module in response to a determined state of lateral expansion of the tape.

Such aspect enables compensation for both skew and TDS issues.

An apparatus according to another aspect of the present invention includes a first module having an array of skew detection transducers. An array of write transducers is spaced from the array of skew detection transducers along an intended direction of tape travel thereacross. An array of read transducers is aligned with the array of write transducers in the intended direction of tape travel. The arrays of read and write transducers are on at least one second module. The at least one second module is movable relative to the first module. A first actuator is configured to operatively exert a force on the array of skew detection transducers for maintaining an orientation of a longitudinal axis of the array of skew detection transducers substantially orthogonal to the direction of tape travel. Longitudinal axes of the arrays of read and write transducers are not pivotable from an orientation thereof relative to the longitudinal axis of the array of skew detection transducers. The first actuator is configured to move the first and the at least one second module together.

Any of these approaches may be implemented in a magnetic data storage system such as a tape drive system, which may include a magnetic head, a drive mechanism for passing a magnetic medium (e.g., recording tape) over the magnetic head, and a controller electrically coupled to the magnetic head.

A magnetic recording medium according to another aspect of the present invention includes a magnetic recording tape having a longitudinal axis extending between distal ends thereof, the magnetic recording tape having vertical bars written in servo-skew patterns thereof, the vertical bars being oriented perpendicular to the longitudinal axis of the magnetic recording tape.

In some approaches, the vertical bars have no other purpose than for skew correction. In some approaches, the vertical bars are positioned above and/or below chevron-based timing-based servo frames of the servo pattern.

Vertical bars provide advantages as noted above, as well as an additional advantage in that dedicated skew detection transducers may be wider since the angle between the vertical bars and the longitudinal axis of the skew detection transducers is 0 degrees. Use of a wider transducer improves the signal to noise ratio (SNR), which improves detection.

Other aspects and approaches of the present invention will become apparent from the following detailed description, which, when taken in conjunction with the drawings, illustrate by way of example the principles of the invention.

BRIEF DESCRIPTION OF THE DRAWINGS

FIGS. 17A-17C illustrate the concept of using skew detection transducers to detect vertical bars in a new servo-skew pattern for skew following, in accordance with one approach.

FIG. 18 depicts an apparatus, in accordance with one approach.

FIG. 19 depicts an apparatus, in accordance with one approach.

FIG. 20 depicts the apparatus of FIG. 18 with skew correction applied.

FIG. 21 depicts an apparatus, in accordance with one approach.

FIG. 22 depicts the apparatus of FIG. 21 with TDS compensation applied.

FIG. 25E is a conceptual diagram of a writer for writing an inventive servo-skew pattern, in accordance with one aspect of the present invention.

FIG. 25F illustrates a frame of an inventive servo-skew pattern written using the writer of FIG. 25E.

FIG. 26 illustrates an exemplary servo-skew pattern with vertical bars for skew detection, in accordance with one approach.

DETAILED DESCRIPTION

Figure 1A:
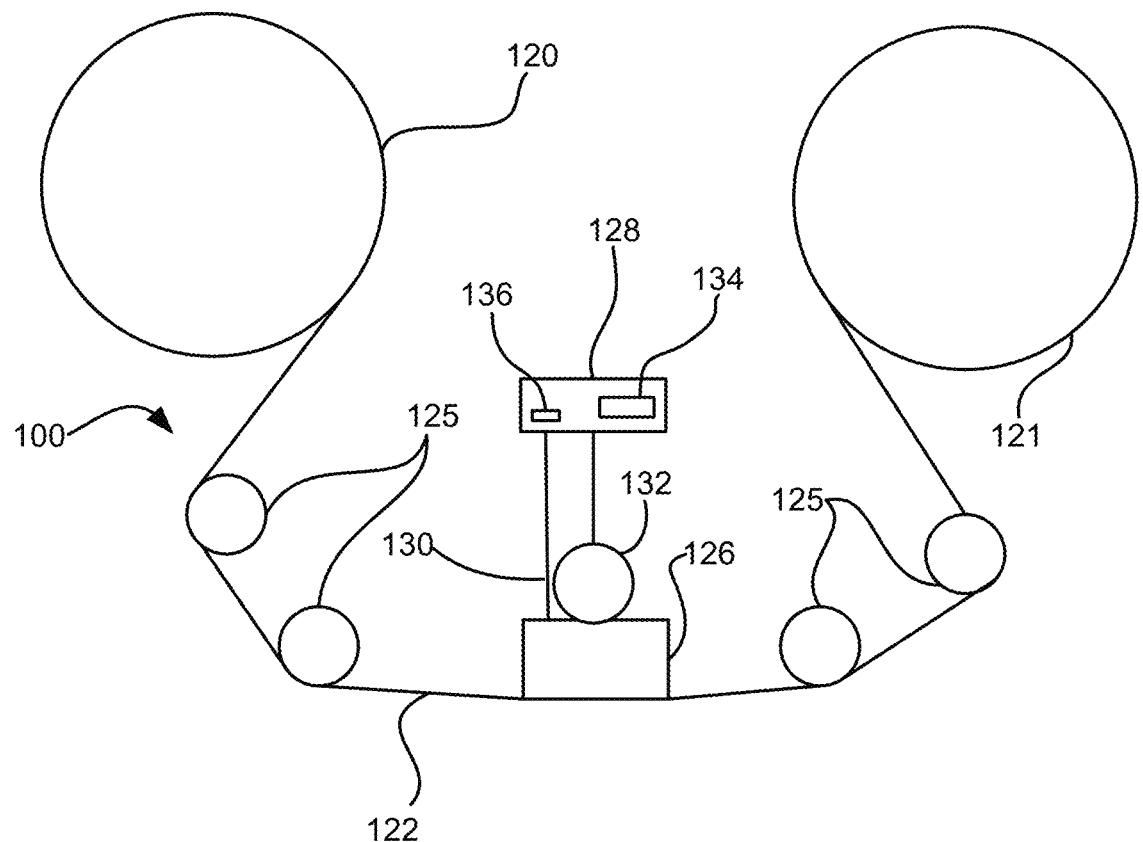
FIG. 1A is a schematic diagram of a simplified tape drive system, in accordance with one approach.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred approaches of magnetic storage systems, as well as operation and/or component parts thereof.

In one general aspect, an apparatus includes an array of skew detection transducers. An array of write transducers is spaced from the array of skew detection transducers along an intended direction of tape travel thereacross. An array of read transducers is aligned with the array of write transducers in the intended direction of tape travel. The apparatus also includes a first actuator configured to operatively exert a force on the array of skew detection transducers for orienting a longitudinal axis of the array of skew detection transducers substantially orthogonal to the actual direction of tape travel across the array of skew detection transducers.

In another general aspect, an apparatus includes a first module having an array of skew detection transducers. An array of write transducers is spaced from the array of skew detection transducers along an intended direction of tape travel thereacross. An array of read transducers is aligned with the array of write transducers in the intended direction of tape travel. The arrays of read and write transducers are on at least one second module. The at least one second module is movable relative to the first module. A first actuator is configured to move the first and the at least one second module together. A second actuator is configured to exert a force on the at least one second module for causing a relative movement of the at least one second module with respect to the first module for adjusting a tilt angle of the at least one second module in response to a determined state of lateral expansion of the tape.

In another general aspect, an apparatus includes a first module having an array of skew detection transducers. An array of write transducers is spaced from the array of skew detection transducers along an intended direction of tape travel thereacross. An array of read transducers is aligned with the array of write transducers in the intended direction of tape travel. The arrays of read and write transducers are on at least one second module. The at least one second module is movable relative to the first module. A first actuator is configured to operatively exert a force on the array of skew detection transducers for maintaining an orientation of a longitudinal axis of the array of skew detection transducers substantially orthogonal to the direction of tape travel. Longitudinal axes of the arrays of read and write transducers are not pivotable from an orientation thereof relative to the longitudinal axis of the array of skew detection transducers. The first actuator is configured to move the first and the at least one second module together.

In another general aspect, a magnetic recording medium includes a magnetic recording tape having a longitudinal axis extending between distal ends thereof, the magnetic recording tape having vertical bars written in servo-skew patterns thereof, the vertical bars being oriented perpendicular to the longitudinal axis of the magnetic recording tape.

FIG. 1A illustrates a simplified tape drive 100 of a tape-based data storage system, which may be employed in the context of the present invention. While one specific implementation of a tape drive is shown in FIG. 1A, it should be noted that the approaches described herein may be implemented in the context of any type of tape drive system.

As shown, a tape supply cartridge 120 and a take-up reel 121 are provided to support a tape 122. One or more of the reels may form part of a removable cartridge and are not necessarily part of the tape drive 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various approaches. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the tape head 126 to be recorded on the tape 122 and to receive data read by the tape head 126 from the tape 122. An actuator 132 controls position of the tape head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
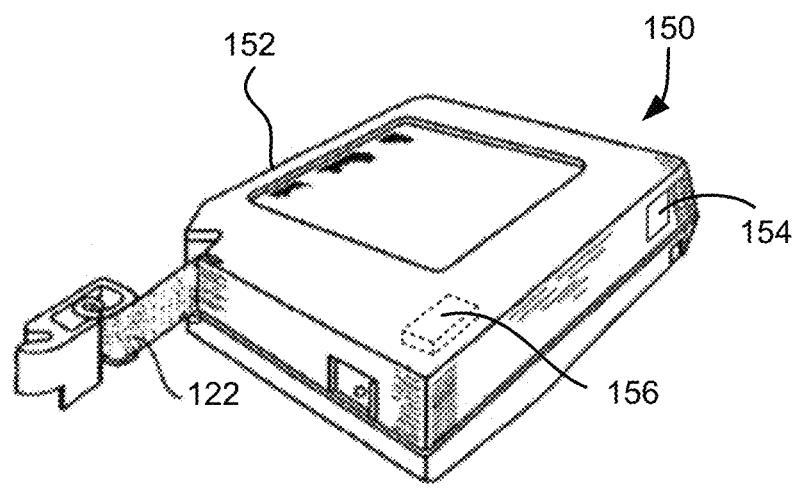
FIG. 1B is a schematic diagram of a tape cartridge, in accordance with one approach.

FIG. 1B illustrates an exemplary tape cartridge 150 according to one approach. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred approach, the nonvolatile memory 156 may be a Flash memory device, read-only memory (ROM) device, etc., embedded into or coupled to the inside or outside of the tape cartridge 150. The nonvolatile memory is accessible by the tape drive and the tape operating software (the driver software), and/or another device.

Figure 2A:
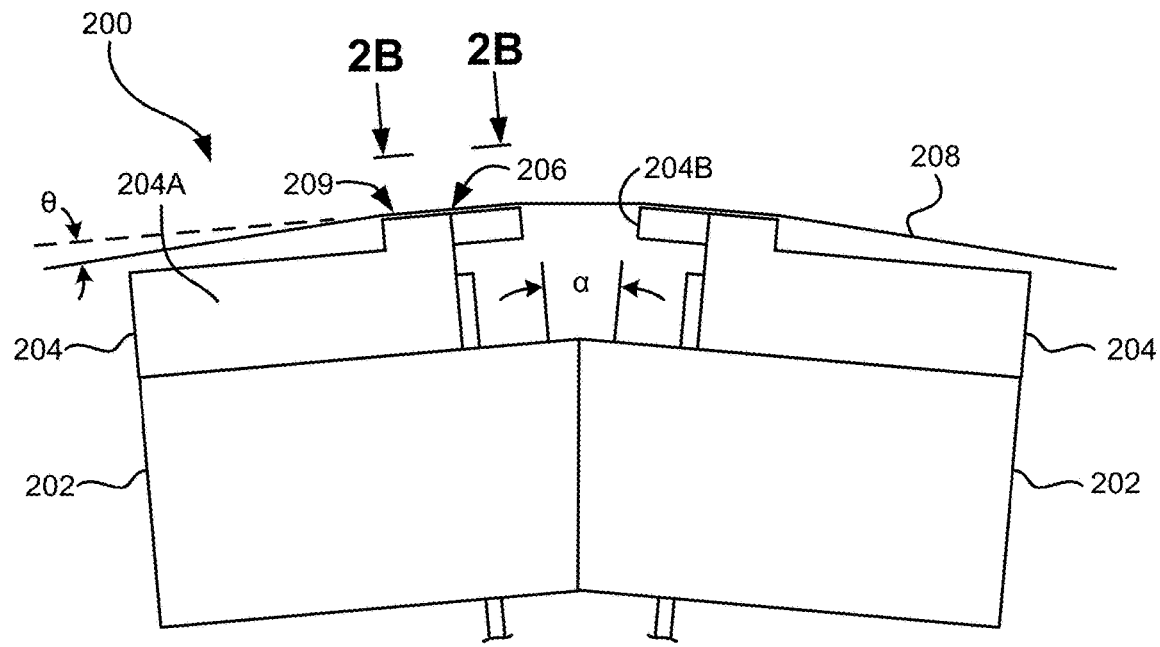
FIG. 2A illustrates a side view of a flat-lapped, bi-directional, two-module magnetic tape head, in accordance with one approach.

By way of example, FIG. 2A illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2B:
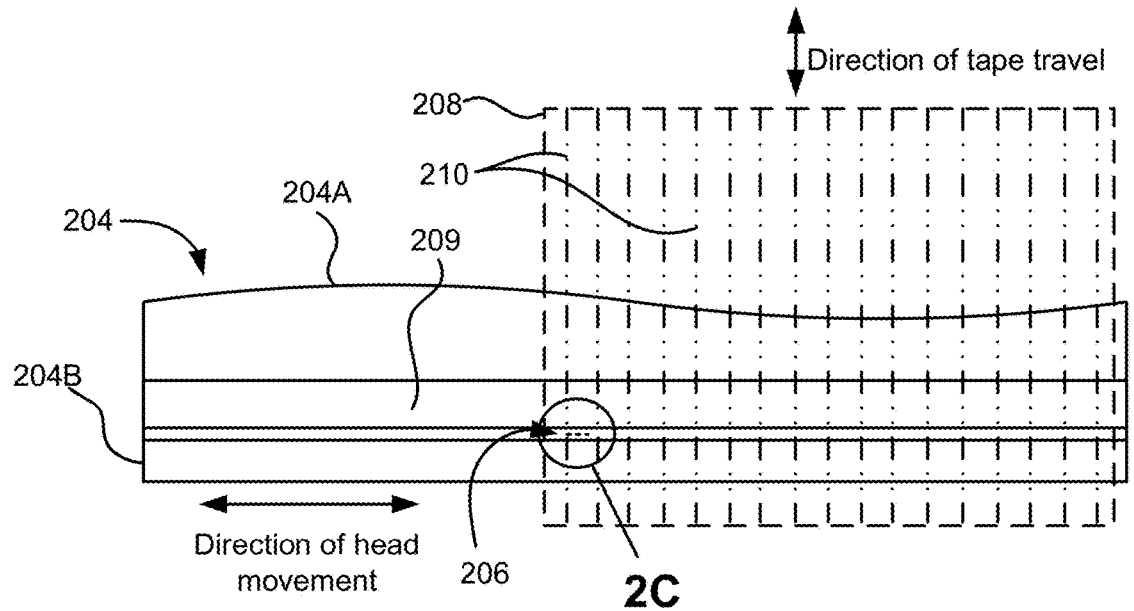
FIG. 2B is a tape bearing surface view taken from Line 2B of FIG. 2A.

FIG. 2B illustrates the tape bearing surface 209 of one of the modules 204 taken from Line 2B of FIG. 2A. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2B on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used for track following, i.e., to keep the readers and/or writers 206 aligned with a particular set of tracks during the read/write operations.

Figure 2C:
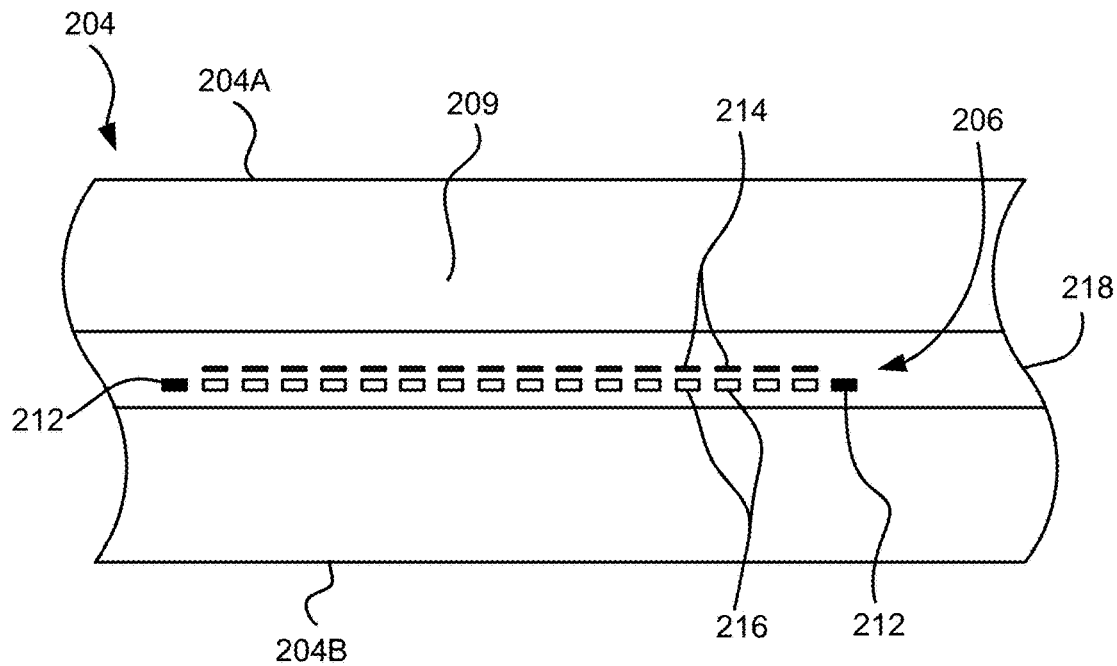
FIG. 2C is a detailed view taken from Circle 2C of FIG. 2B.

FIG. 2C depicts a plurality of readers and/or writers 206 formed in a gap 218 on the module 204 in Circle 2C of FIG. 2B. As shown, the array of readers and writers 206 includes, for example, 16 writers 214, 16 readers 216 and two servo readers 212, though the number of elements may vary. Illustrative approaches include 8, 16, 32, 40, and 64 active readers and/or writers 206 per array, and alternatively interleaved designs having odd numbers of reader or writers such as 17, 25, 33, etc. An illustrative approach includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2C, the readers 216 and writers 214 may also be arranged in an interleaved configuration. Alternatively, each array of readers and/or writers 206 may be readers or writers only, and the arrays may contain one or more servo readers 212. As noted by considering FIGS. 2A and 2B-2C together, each module 204 may include a complementary set of readers and/or writers 206 for such things as bi-directional reading and writing, read-while-write capability, backward compatibility, etc.

Figure 2D:
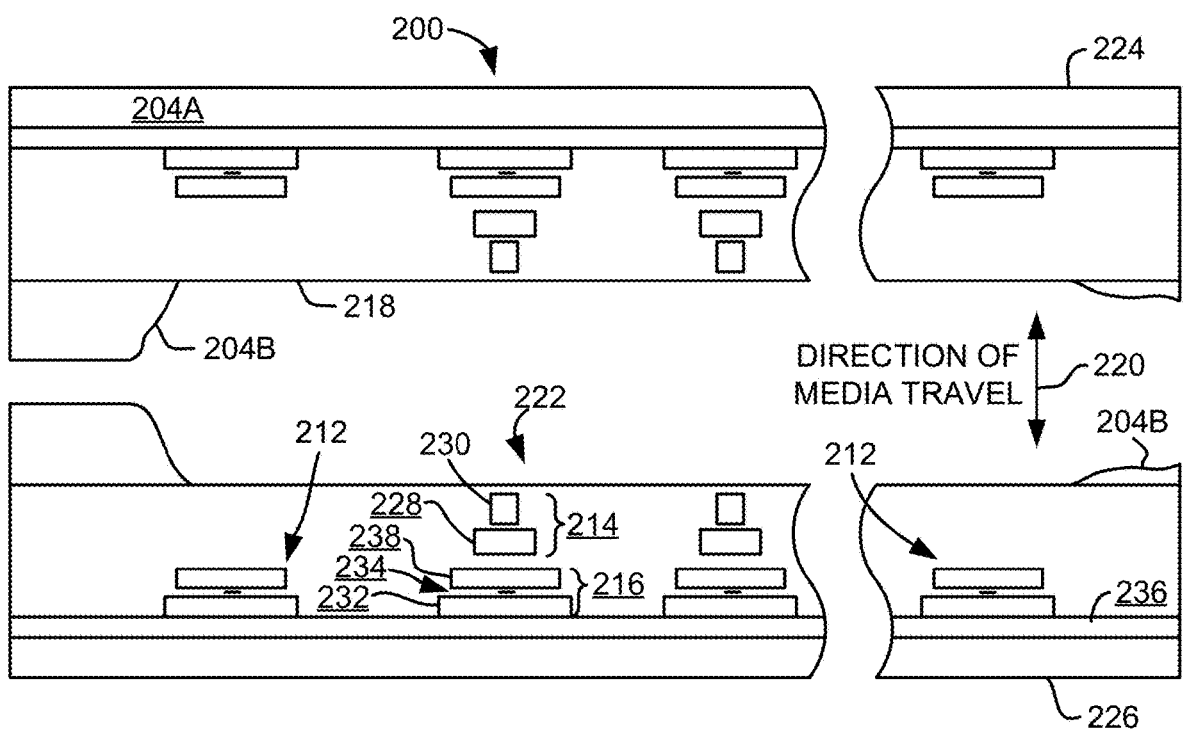
FIG. 2D is a detailed view of a partial tape bearing surface of a pair of modules.

FIG. 2D shows a partial tape bearing surface view of complementary modules of a magnetic tape head 200 according to one approach. In this approach, each module has a plurality of read/write (R/W) pairs in a piggyback configuration formed on a common substrate 204A and an optional electrically insulative insulating layer 236. The writers 214 and the readers 216 are aligned parallel to an intended direction of travel of a tape medium thereacross to form an RAY pair, exemplified by R/W pairs 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a magnetic tape head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (–), cobalt zirconium tantalum (CZT) or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer poles 228, 230, and a coil (not shown). The sensor may be of any known type, including those based on magnetoresistive (MR), GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
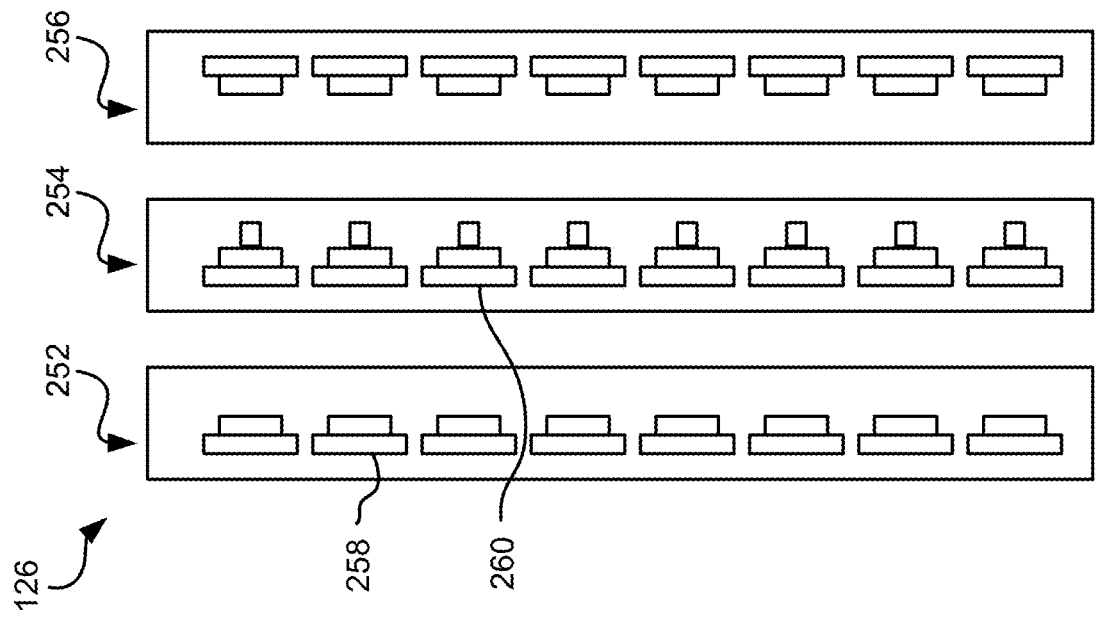
FIG. 4 is a partial tape bearing surface view of a magnetic head having a read-write-read configuration.
Figure 3:
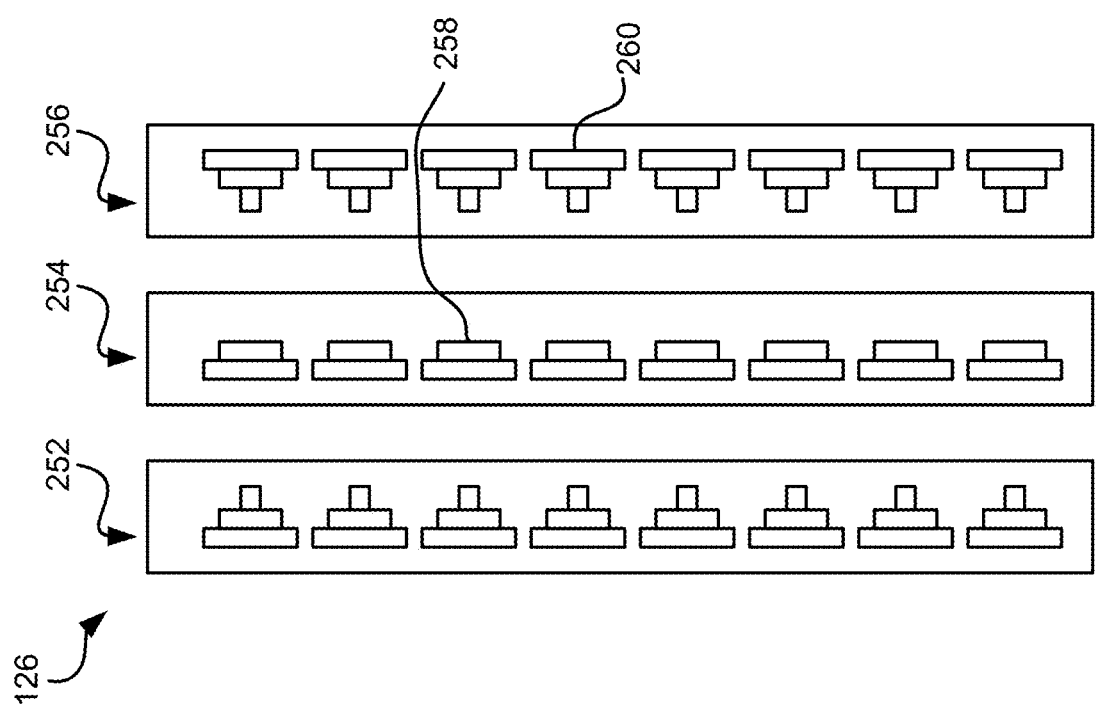
FIG. 3 is a partial tape bearing surface view of a magnetic head having a write-read-write configuration.

The configuration of the tape head 126 according to one approach includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify approaches of the present invention. One skilled in the art apprised with the teachings herein will appreciate how permutations of the present invention would apply to configurations other than a W-R-W configuration.

Figure 5:
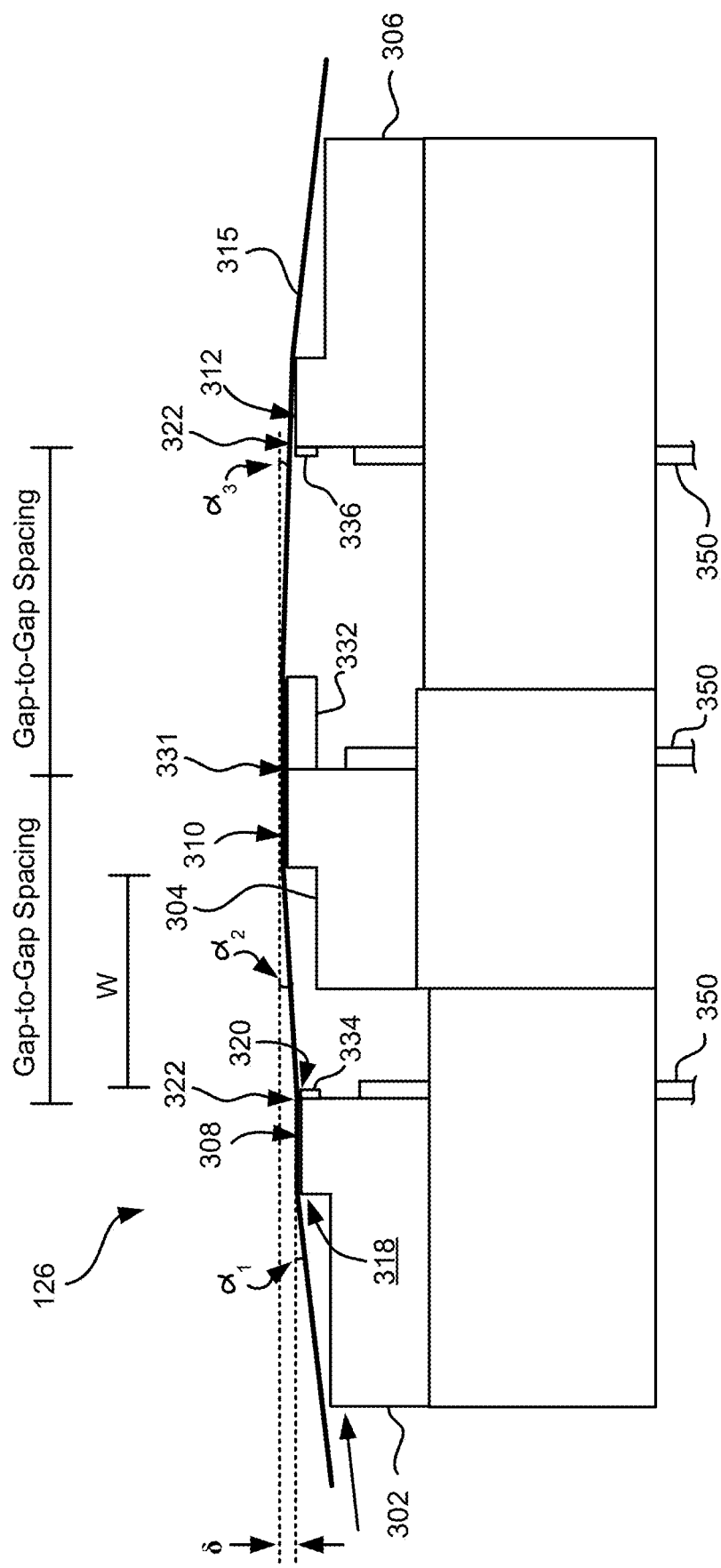
FIG. 5 is a side view of a magnetic tape head with three modules according to one approach where the modules all generally lie along about parallel planes.

FIG. 5 illustrates a magnetic head 126 according to one approach of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three-module design for tape moving in the indicated direction. The third module 306 will be referred to as the "trailing" module. The trailing module follows the middle module and is the last module seen by the tape in a three-module design. The leading and trailing modules 302, 306 are referred to collectively as outer modules. Also note that the outer modules 302, 306 will alternate as leading modules, depending on the direction of travel of the tape 315.

Figure 6:
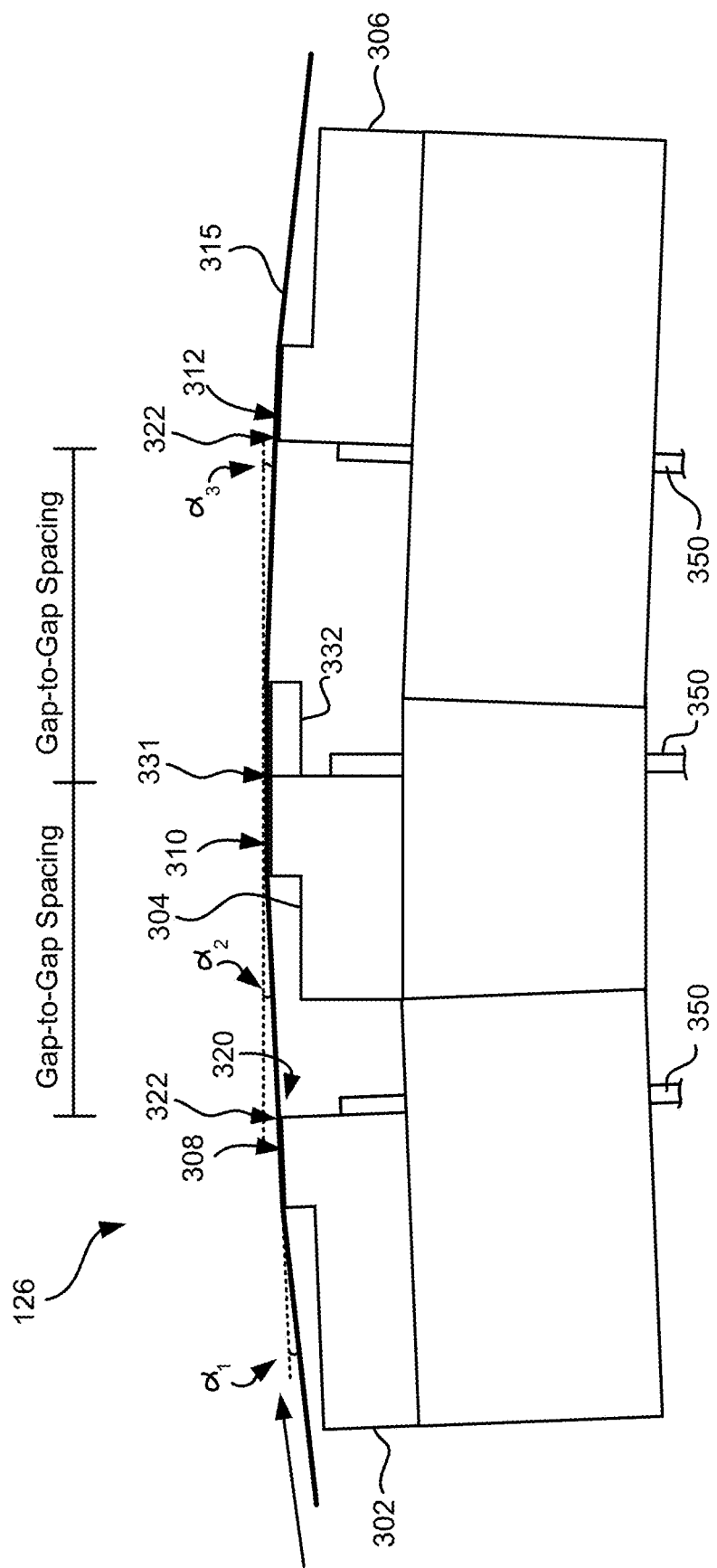
FIG. 6 is a side view of a magnetic tape head with three modules in a tangent (angled) configuration.

In one approach, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by a skiving edge 318 of the leading module 302 has been found by experimentation to be sufficient to keep the tape adhered to the tape bearing surface 308 of the leading module 302. A trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, transducers 322 may be located near the trailing edges of the outer modules 302, 306. These approaches are particularly adapted for write-read-write applications.

A benefit of this and other approaches described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller as tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one approach, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some aspects, the second module 304 has a closure, while the first and third modules 302, 306 do not have a closure. Where there is no closure, preferably a hard coating is added to the module. One preferred coating is diamond-like carbon (DLC).

In the approach shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used linear tape open (LTO) tape head spacing. The open space between the modules 302, 304, 306 can still be set to approximately 0.5 to 0.6 mm, which in some approaches is ideal for stabilizing tape motion over the second module 304.

Depending on tape tension and stiffness, it may be desirable to angle the tape bearing surfaces of the outer modules relative to the tape bearing surface of the second module. FIG. 6 illustrates an approach where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this approach, thereby reducing wear on the elements in the trailing module 306. These approaches are particularly useful for write-read-write applications. Additional aspects of these approaches are similar to those given above.

Typically, the tape wrap angles may be set about midway between the approaches shown in FIGS. 5 and 6.

Figure 7:
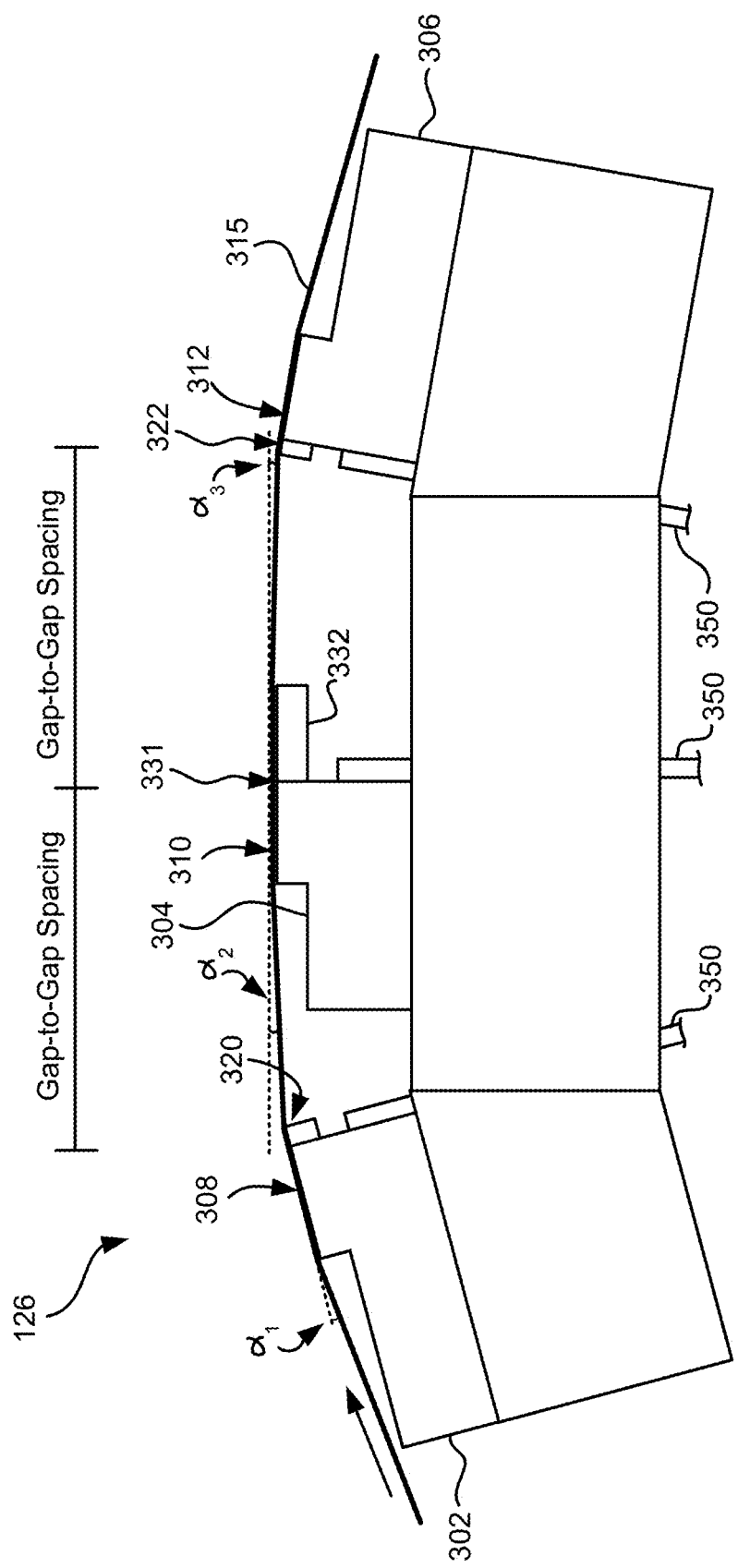
FIG. 7 is a side view of a magnetic tape head with three modules in an overwrap configuration.

FIG. 7 illustrates an approach where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this approach, the tape does not pop off of the trailing module, allowing it to be used for writing or reading. Accordingly, the leading and middle modules can both perform reading and/or writing functions while the trailing module can read any just-written data. Thus, these approaches are preferred for write-read-write, read-write-read, and write-write-read applications. In the latter approaches, closures should be wider than the tape canopies for ensuring read capability. The wider closures may require a wider gap-to-gap separation. Therefore, a preferred approach has a write-read-write configuration, which may use shortened closures that thus allow closer gap-to-gap separation.

Additional aspects of the approaches shown in FIGS. 6 and 7 are similar to those given above.

A 32 channel version of a multi-module tape head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the approaches described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various approaches in conformance with the teachings herein, as would become apparent to one skilled in the art upon reading the present disclosure.

Figure 8A:
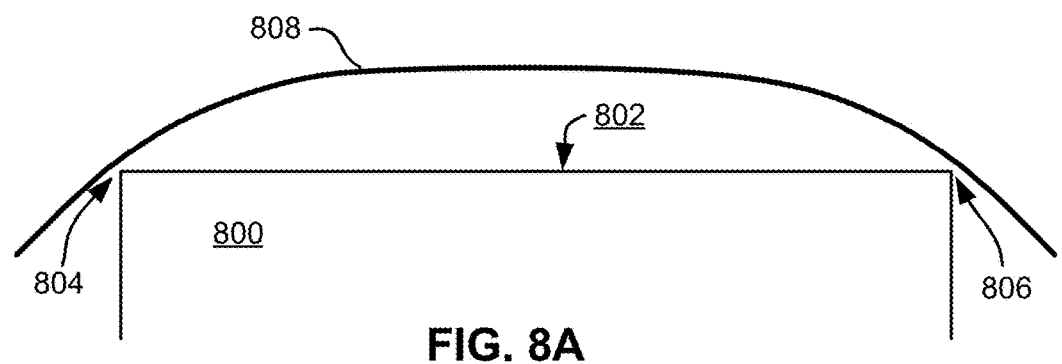
FIGS. 8A-8C are schematics depicting the principles of tape tenting.
Figure 8B:
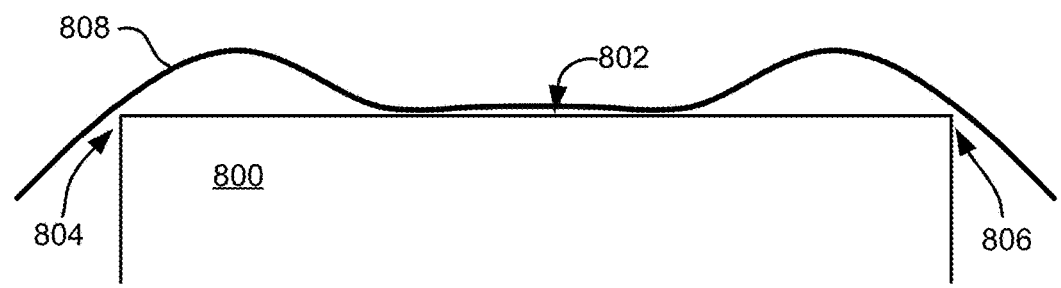
Figure 8C:
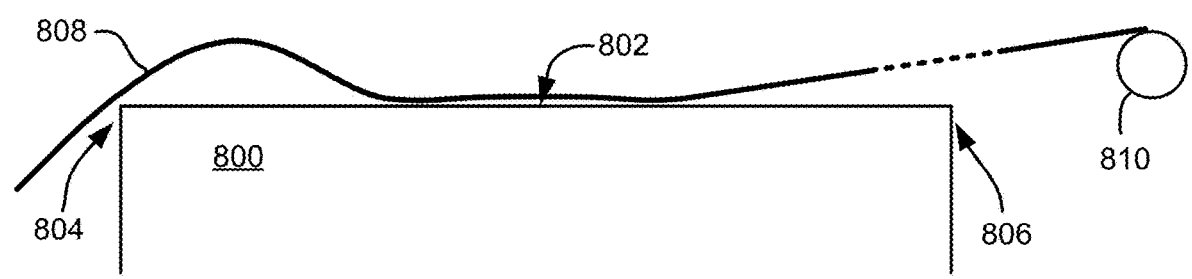

As a tape is run over a module, it is preferred that the tape passes sufficiently close to magnetic transducers on the module such that reading and/or writing is efficiently performed, e.g., with a low error rate. According to some approaches, tape tenting may be used to ensure the tape passes sufficiently close to the portion of the module having the magnetic transducers. To better understand this process, FIGS. 8A-8C illustrate the principles of tape tenting. FIG. 8A shows a module 800 having an upper tape bearing surface 802 extending between opposite edges 804, 806. A stationary tape 808 is shown wrapping around the edges 804, 806. As shown, the bending stiffness of the tape 808 lifts the tape off of the tape bearing surface 802. Tape tension tends to flatten the tape profile, as shown in FIG. 8A. Where tape tension is minimal, the curvature of the tape is more parabolic than shown.

FIG. 8B depicts the tape 808 in motion. The leading edge, i.e., the first edge the tape encounters when moving, may serve to skive air from the tape, thereby creating a subambient air pressure between the tape 808 and the tape bearing surface 802. In FIG. 8B, the leading edge is the left edge and the right edge is the trailing edge when the tape is moving left to right. As a result, atmospheric pressure above the tape urges the tape toward the tape bearing surface 802, thereby creating tape tenting proximate each of the edges. The tape bending stiffness resists the effect of the atmospheric pressure, thereby causing the tape tenting proximate both the leading and trailing edges. Modeling predicts that the two tents are very similar in shape.

FIG. 8C depicts how the subambient pressure urges the tape 808 toward the tape bearing surface 802 even when a trailing guide 810 is positioned above the plane of the tape bearing surface.

It follows that tape tenting may be used to direct the path of a tape as it passes over a module. As previously mentioned, tape tenting may be used to ensure the tape passes sufficiently close to the portion of the module having the magnetic transducers, preferably such that reading and/or writing is efficiently performed, e.g., with a low error rate.

Magnetic tapes may be stored in tape cartridges that are, in turn, stored at storage slots or the like inside a data storage library. The tape cartridges may be stored in the library such that they are accessible for physical retrieval. In addition to magnetic tapes and tape cartridges, data storage libraries may include data storage drives that store data to, and/or retrieve data from, the magnetic tapes. Moreover, tape libraries and the components included therein may implement a file system which enables access to tape and data stored on the tape.

File systems may be used to control how data is stored in, and retrieved from, memory. Thus, a file system may include the processes and data structures that an operating system uses to keep track of files in memory, e.g., the way the files are organized in memory. Linear Tape File System (LTFS) is an exemplary format of a file system that may be implemented in a given library in order to enables access to compliant tapes. It should be appreciated that various approaches herein can be implemented with a wide range of file system formats, including for example IBM Spectrum Archive Library Edition (LTFS LE). However, to provide a context, and solely to assist the reader, some of the approaches below may be described with reference to LTFS which is a type of file system format. This has been done by way of example only, and should not be deemed limiting on the invention defined in the claims.

A tape cartridge may be "loaded" by inserting the cartridge into the tape drive, and the tape cartridge may be "unloaded" by removing the tape cartridge from the tape drive. Once loaded in a tape drive, the tape in the cartridge may be "threaded" through the drive by physically pulling the tape (the magnetic recording portion) from the tape cartridge, and passing it above a magnetic head of a tape drive. Furthermore, the tape may be attached on a take-up reel (e.g., see 121 of FIG. 1A above) to move the tape over the magnetic head.

Once threaded in the tape drive, the tape in the cartridge may be "mounted" by reading metadata on a tape and bringing the tape into a state where the LTFS is able to use the tape as a constituent component of a file system. Moreover, in order to "unmount" a tape, metadata is preferably first written on the tape (e.g., as an index), after which the tape may be removed from the state where the LTFS is allowed to use the tape as a constituent component of a file system. Finally, to "unthread" the tape, the tape is unattached from the take-up reel and is physically placed back into the inside of a tape cartridge again. The cartridge may remain loaded in the tape drive even after the tape has been unthreaded, e.g., waiting for another read and/or write request. However, in other instances, the tape cartridge may be unloaded from the tape drive upon the tape being unthreaded, e.g., as described above.

Magnetic tape is a sequential access medium. Thus, new data is written to the tape by appending the data at the end of previously written data. It follows that when data is recorded in a tape having only one partition, metadata (e.g., allocation information) is continuously appended to an end of the previously written data as it frequently updates and is accordingly rewritten to tape. As a result, the rearmost information is read when a tape is first mounted in order to access the most recent copy of the metadata corresponding to the tape. However, this introduces a considerable amount of delay in the process of mounting a given tape.

To overcome this delay caused by single partition tape mediums, the LTFS format includes a tape that is divided into two partitions, which include an index partition and a data partition. The index partition may be configured to record metadata (meta information), e.g., such as file allocation information (Index), while the data partition may be configured to record the body of the data, e.g., the data itself.

Figure 9:
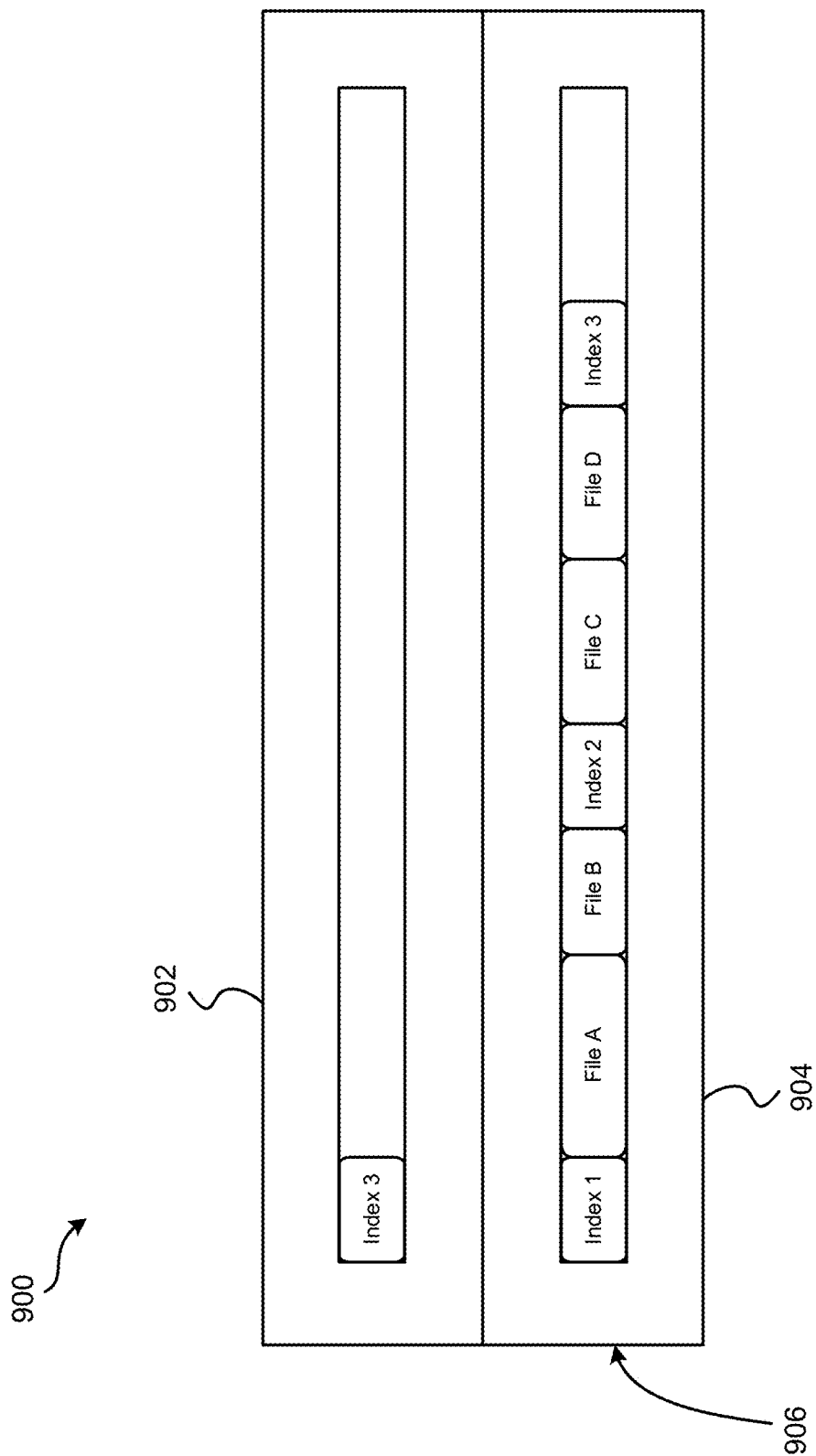
FIG. 9 is a representational diagram of files and indexes stored on a magnetic tape, in accordance with one approach.

Looking to FIG. 9, a magnetic tape 900 having an index partition 902 and a data partition 904 is illustrated according to one approach. As shown, data files and indexes are stored on the tape. The LTFS format allows for index information to be recorded in the index partition 902 at the beginning of tape 906, as would be appreciated by one skilled in the art upon reading the present description.

As index information is updated, it preferably overwrites the previous version of the index information, thereby allowing the currently updated index information to be accessible at the beginning of tape in the index partition. According to the specific example illustrated in FIG. 9, a most recent version of metadata Index 3 is recorded in the index partition 902 at the beginning of the tape 906. Conversely, all three version of metadata Index 1, Index 2, Index 3 as well as data File A, File B, File C, File D are recorded in the data partition 904 of the tape. Although Index 1 and Index 2 are old (e.g., outdated) indexes, because information is written to tape by appending it to the end of the previously written data as described above, these old indexes Index 1, Index 2 remain stored on the tape 900 in the data partition 904 without being overwritten.

The metadata may be updated in the index partition 902 and/or the data partition 904 the same or differently depending on the desired approach. According to some approaches, the metadata of the index and/or data partitions 902, 904 may be updated in response to the tape being unmounted, e.g., such that the index may be read quickly from the index partition when that tape is mounted again. The metadata is preferably also written in the data partition 904 so the tape may be mounted using the metadata recorded in the data partition 904, e.g., as a backup option.

According to one example, which is no way intended to limit the invention, LTFS LE may be used to provide the functionality of writing an index in the data partition when a user explicitly instructs the system to do so, or at a time designated by a predetermined period which may be set by the user, e.g., such that data loss in the event of sudden power stoppage can be mitigated.

Figure 10:
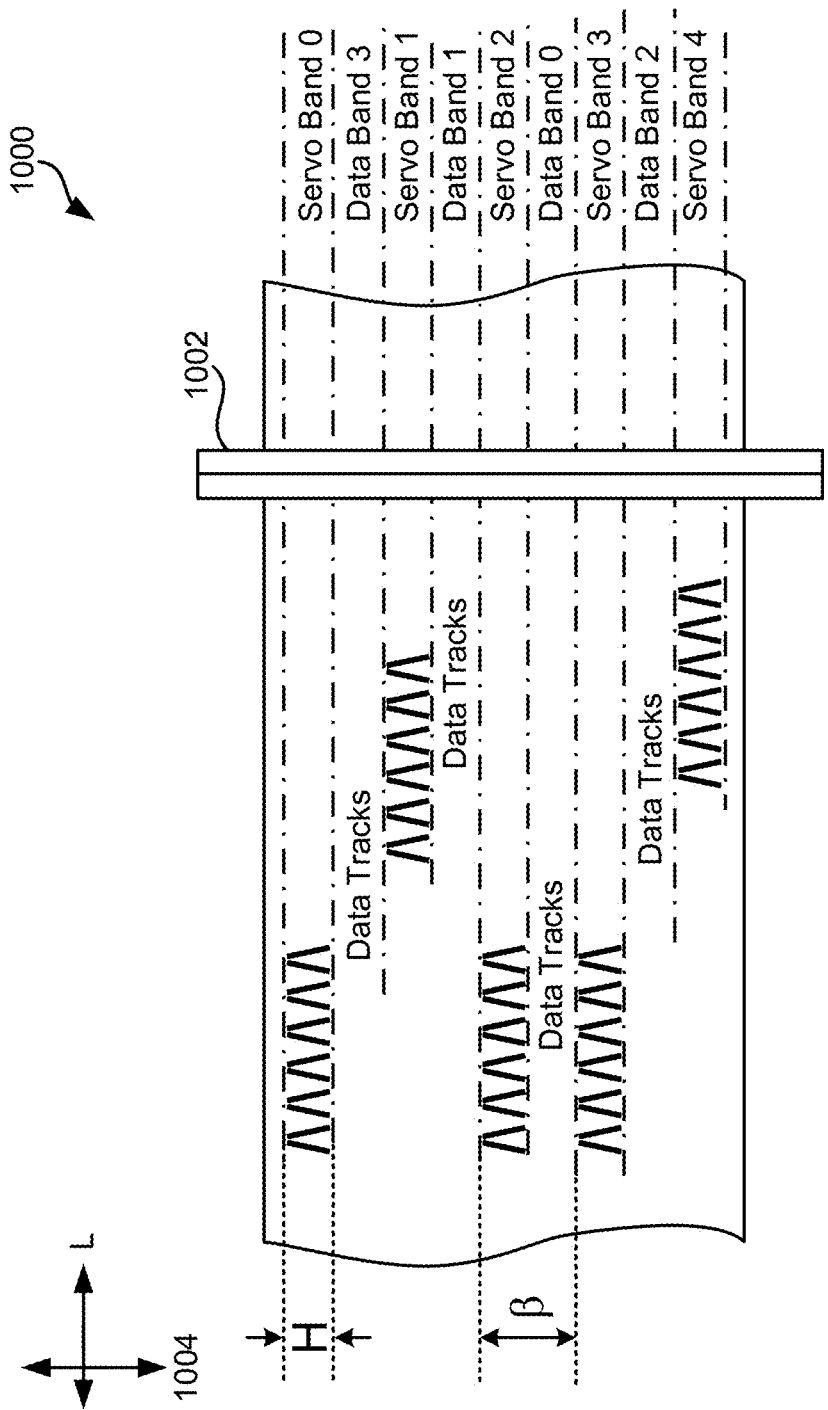
FIG. 10 illustrates a tape layout, in accordance with one aspect of the present invention.

Referring to FIG. 10, an illustrative tape layout is depicted in accordance with one aspect. As shown, a magnetic recording tape 1000 has a tape layout which implements five servo bands Servo Band 0-Servo Band 4, and four data bands Data Band 0-Data Band 3, e.g., as specified in the LTO format and IBM® Enterprise format. The height H of each of the timing-based servo (TBS) servo bands is measured in the cross-track direction 1004 which is about orthogonal to the length L of the tape 1000. According to an example, the height H of each of the servo bands may be about 186 microns according to the LTO format. Moreover, a pitch β between the servo bands as shown may be about 2859 microns, again according to the LTO format.

An exemplary tape head 1002 is also shown as having two modules and as being positioned over a portion of the tape 1000 according to one approach. Read and/or write transducers may be positioned on either module of the tape head 1002 according to any of the approaches described herein, and may be used to read data from and/or write data to the data bands. Furthermore, tape head 1002 may include servo readers which may be used to read the servo patterns in the servo bands according to any of the approaches described herein. It should also be noted that the dimensions of the various components included in FIG. 10 are presented by way of example only and are in no way intended to be limiting.

Some tape drives may be configured to operate at low tape velocities and/or with nanometer head position settings. These tape drives may use servo formats that target Barium Ferrite (BaFe) tape media, 4 or 8 data bands, 32 or 64 data channel operation, allow very low velocity operation, support large-bandwidth actuator operation, and improve parameter estimation to minimize standard deviation of the position error signal (PES), thus enabling track-density scaling for tape cartridge capacities up to 100 TB and beyond.

However, according to some approaches, magnetic tape may further be augmented with additional features that provide additional functionality. Accordingly, HD servo patterns may be implemented with standard TBS patterns. The HD servo patterns may be used to improve track-following performance. Accordingly, a standard TBS pattern (e.g., as shown in FIG. 10) may be implemented in combination with one or more HD servo patterns. One implementation includes a servo pattern scheme in which a standard TBS pattern is retained and additional HD patterns are provided in a dedicated, preferably currently unused area of the tape media. This type of pattern may be implemented by increasing the number of data channels from 16 to 32, and reducing the width of the TBS pattern from 186 microns to 93 microns, in some approaches.

Figure 11:
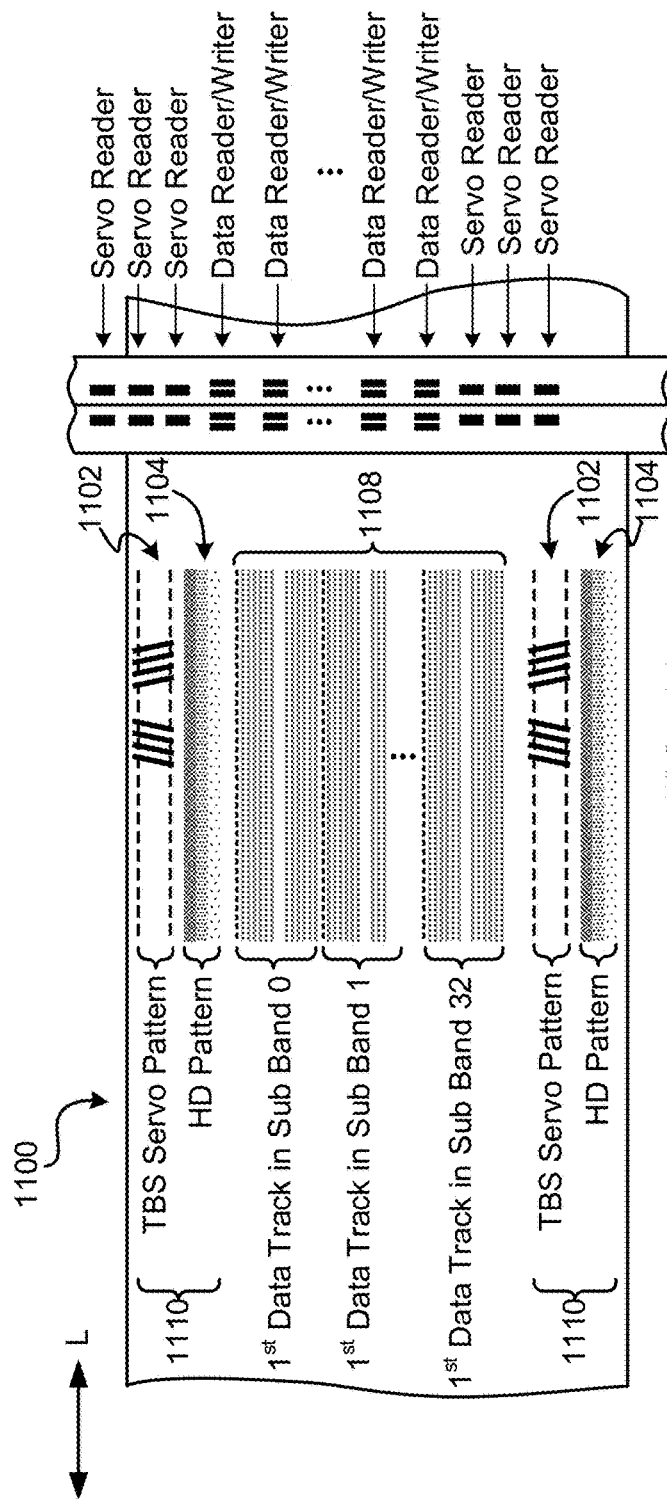
FIG. 11 shows a hybrid servo pattern written in a dedicated area of a tape medium, in accordance with one aspect of the present invention.

FIG. 11 depicts a representation of a data band 1100 having a hybrid servo pattern 1110, which includes a TBS pattern 1102 written in a servo band, as well as an HD pattern 1104 that is written in a HD band (e.g., dedicated area) of the tape medium 1108. Moreover, each HD pattern 1104 includes a number of HD tracks, each of the HD tracks corresponding to a respective periodic waveform, in a conventional manner. In some approaches, significant features of the TBS pattern 1102 are retained, such as a servo frame structure having four servo bursts containing a number of servo stripes, where the servo stripes of adjacent servo bursts are written with alternating azimuthal angle. Other parameters of legacy servo patterns, such as the servo pattern height and other geometric dimensions, as well as the number of servo stripes per burst, may be modified as desired.

The detection of the periodic waveforms forming a HD pattern may be obtained by a conventional HD servo detector circuit that implements a complex algorithmic conversion, e.g., such as a Discrete Fourier Transform (DFT), a Fast Fourier Transform (FFT), etc.

Figure 12:
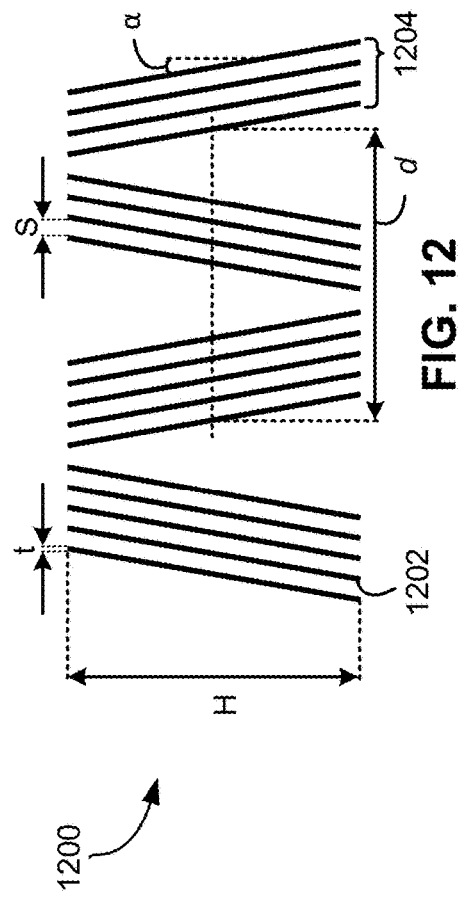
FIG. 12 shows a partial detailed view of a (TBS) pattern, in accordance with one aspect of the present invention.

FIG. 12 depicts a partial detailed view of a portion of a TBS pattern 1200 (e.g., a TBS frame of the TBS patterns shown in FIG. 10 or 11) according to an exemplary approach. As shown, a plurality of servo stripes 1202 together form a servo burst 1204, while corresponding pairs of servo bursts 1204 form servo sub-frames. Accordingly, the depicted TBS frame has four servo bursts 1204 and two servo sub-frames. In the present approach, the servo bursts 1204 included in the left servo sub-frame each have five servo stripes 1202, while the servo bursts 1204 included in the right servo sub-frame each have four servo stripes 1202. The servo stripes 1202 included in a given servo burst 1204 are oriented such that they have a same azimuthal slope represented by angle α. Moreover, corresponding pairs of servo bursts 1204 have opposing azimuthal slopes, thereby forming a chevron-type pattern. The height H and thickness t of the servo stripes 1202 may vary depending on the servo writer used to write the TBS pattern. According to an exemplary approach, which is in no way intended to limit the invention, the height H may be about 186 µm, and the angle α may be about 6°, while the thickness t is about 2.1 µm. Moreover, the spacing S between each of the servo stripes 1202 and/or the distance d between servo bursts 1204 having the same azimuthal slope may vary depending on the desired approach. According to an exemplary approach, which is in no way intended to limit the invention, the spacing S may be about 5 µm, while the distance d is about 100 µm. As described above, patterned transitions such as that shown in FIG. 12 allow for an estimate of the head lateral position to be determined by evaluating the relative timing of pulses generated by a servo reader reading the servo stripes 1202 of the servo burst 1204 as they are passed over the servo reader.

Referring again to FIG. 11, the HD pattern 1104 may include periodic waveforms written on adjacent tracks. For example, two periodic waveforms, characterized by two different spatial frequencies: low-frequency $f_1$ and high-frequency $f_2$, where $f_2 > f_1$. However, a wider range of lateral head displacement is desired. Accordingly, a different configuration of the HD patterns may be used to avoid ambiguity in determining the lateral displacement.

Figure 13:
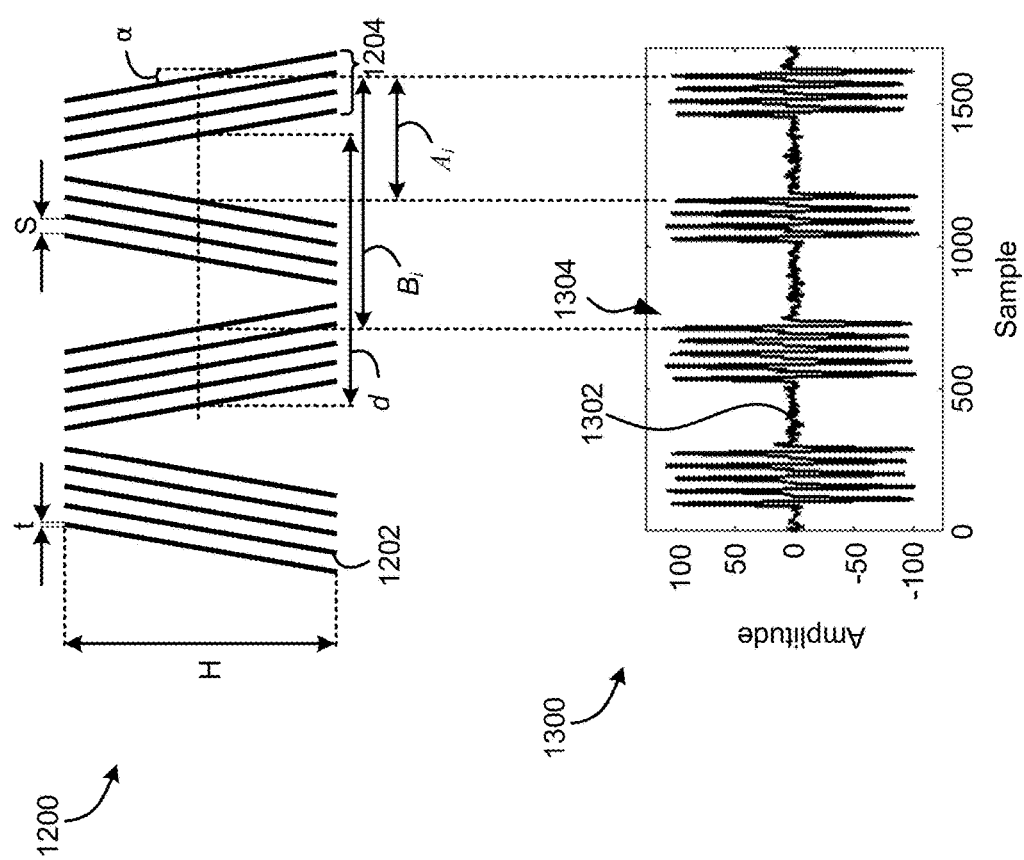
FIG. 13 shows a graph plotting sample vs. amplitude of the TBS pattern of FIG. 12, in accordance with one aspect of the present invention.

FIG. 13 illustrates a graph 1300 plotting sample vs. amplitude of the TBS pattern 1200 of FIG. 12, detected as a servo readback signal 1302 during readback. A servo channel may decode the readback signal that is received from a servo reader of a magnetic tape head reading the TBS pattern 1200. For example, when a servo stripe 1202 of the TBS pattern 1200 passes across the servo sensor, a double pulse portion 1304 (having a positive peak and a negative peak) of the readback signal 1302 is generated, e.g., for purposes of an example see lateral dashed lines indicating how double pulse portions of the readback signal 1302 correspond to servo stripe read locations. Accordingly, two or more of such double pulse portions and timing associated therewith may be used in calculating lateral position (y-position) estimates.

In one approach, the servo channel may provide y-position estimates to a track-following control system, e.g., where such y-position estimates are calculated using Equation 1 below.

$$\hat{y} = \frac{d}{2\tan(\alpha)} \left( \frac{1}{2} - \frac{\sum A_i}{\sum B_i} \right) \qquad \text{Equation 1}$$

As shown above, the lateral y-position estimate ŷ of Equation 1 may incorporate: the distance d, the azimuthal slope (angle α) of the servo stripes 1202, a measured time $B_i$ between pairs of corresponding servo stripes with the same azimuth angle (e.g., parallel stripes //, or \\) from two different sub-frames, and a measured time $A_i$ between pairs of corresponding servo stripes with opposite azimuth angle (e.g., stripes/\) from the same sub-frame.

For example, in the 5-5-4-4 pattern of FIG. 13, four measurements $A_i$, i=0, 1, 2, 3 and four measurements of $B_i$, i=0, 1, 2, 3 are performed per servo sub-frame of the TBS pattern 1200. In some approaches, the distance d is may be referred to as the "sub-frame length."

A conventional servo detector may be used, with appropriate modifications as needed, to process servo signals in accordance with any of the approaches described herein.

Figure 14:
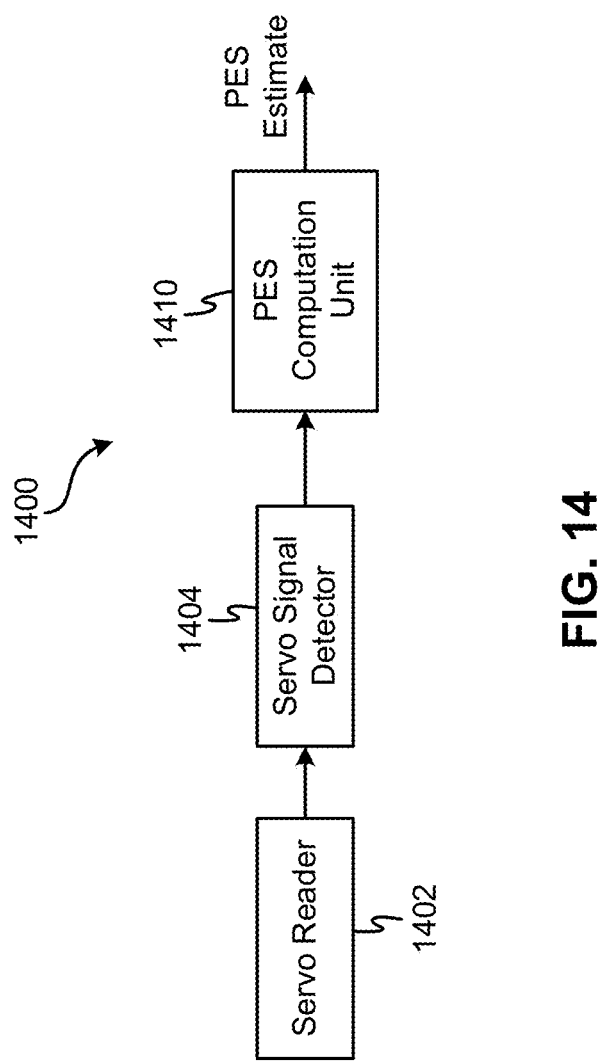
FIG. 14 shows a block diagram of a detector for servo patterns, in accordance with one approach.

FIG. 14 shows a block diagram of a servo detector 1400 configured for the computation of the PES from a TBS pattern. The servo signal from the servo reader 1402 is detected using a servo signal detector 1404. The output of the detector 1404 is then processed by a PES computation unit 1410, which determines a PES estimate in a conventional manner, e.g., based on timing information from a servo signal.

As noted above, the quantity of data stored on a magnetic tape may be expanded by increasing the number of data tracks across the tape. More tracks are made possible by reducing feature sizes of the readers and writers, such as by using thin-film fabrication techniques and magnetoresistive (MR) sensors. However, for various reasons, the feature sizes of readers and writers cannot be arbitrarily reduced. Factors such as tape skew and tape lateral expansion and contraction must be dealt with to provide acceptable readback signals.

Figure 15B:
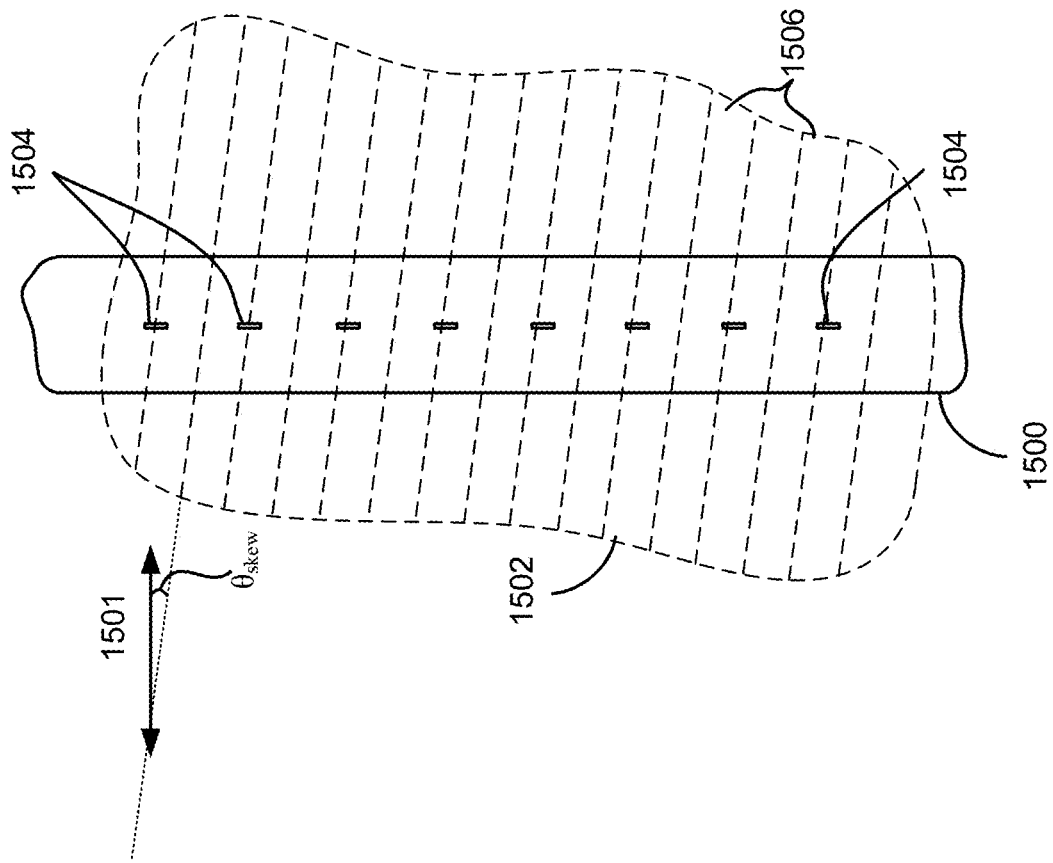
FIGS. 15A-15D are representative drawings showing the effect of tape skew on transducer positions relative thereto.
Figure 15A:
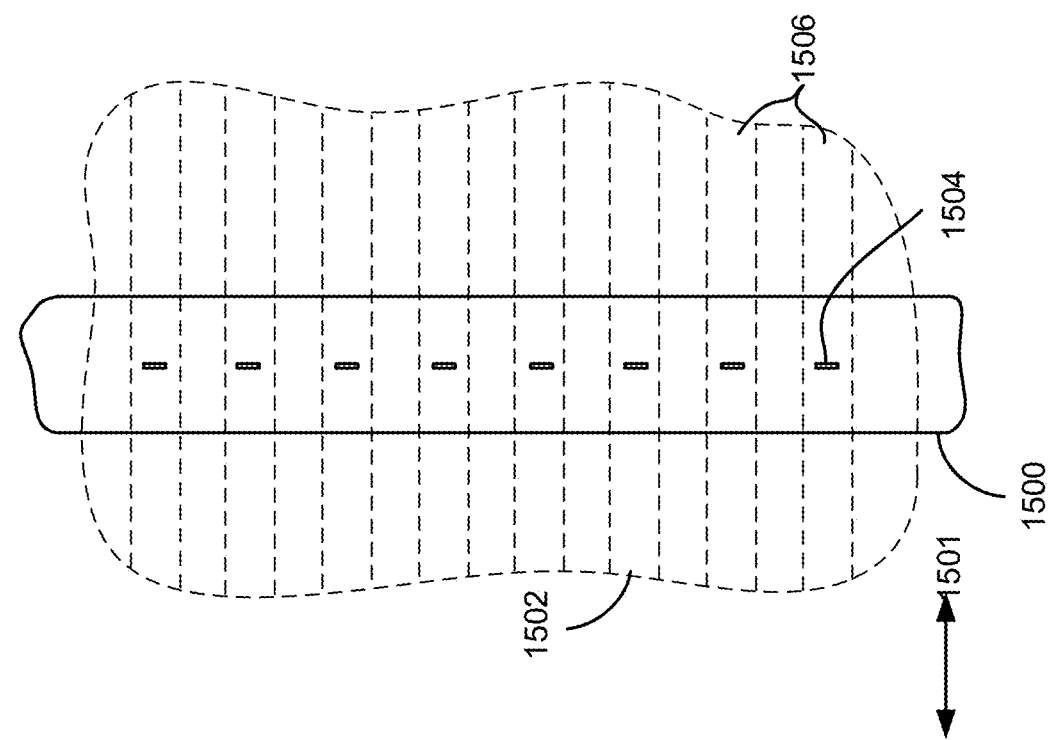
Figure 15D:
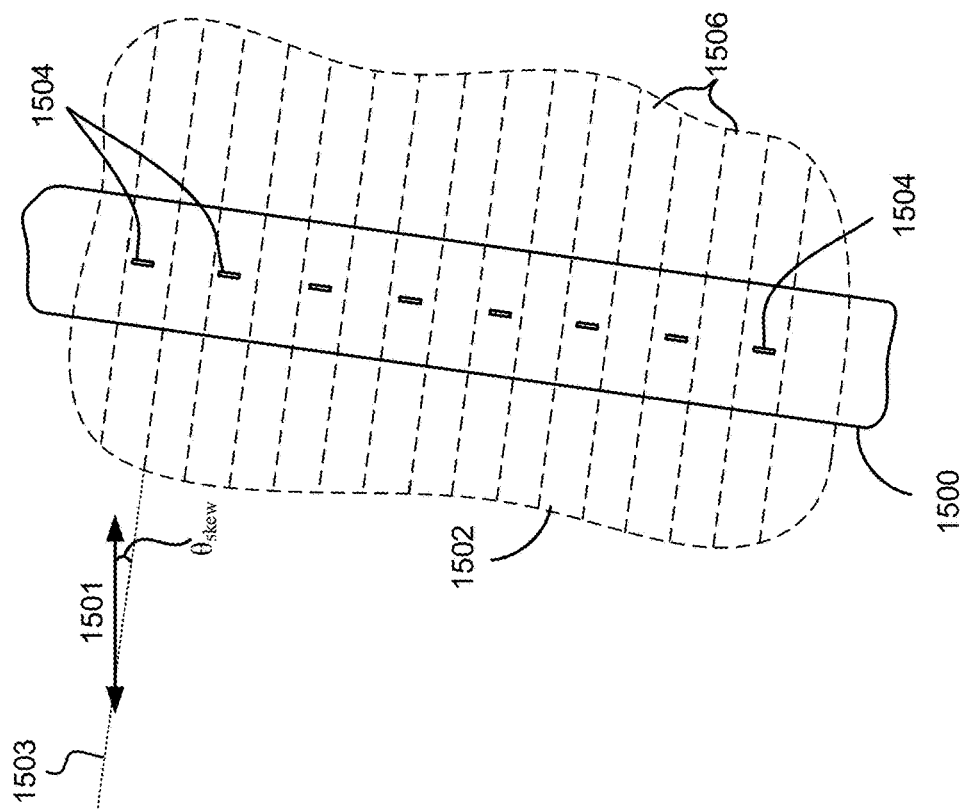
Figure 15C:
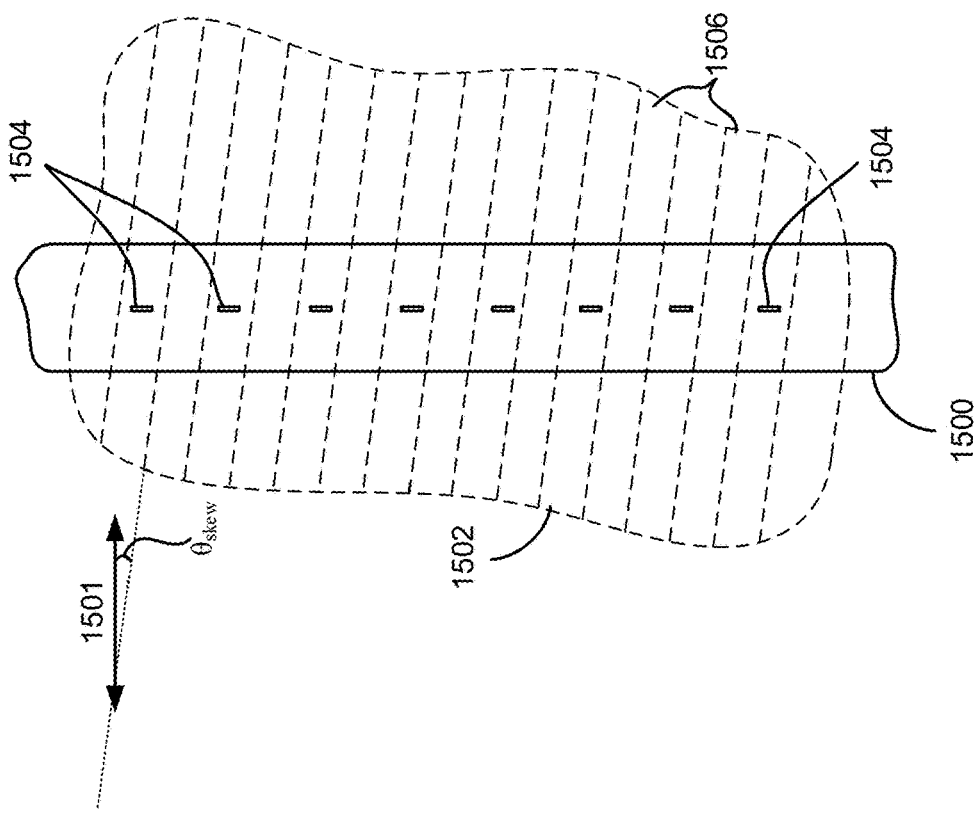

With regards to tape skew, and by way of example, FIGS. 15A-15D represent the effect of tape skew on reader position relative thereto. FIG. 15A shows a head 1500 relative to the tape 1502, where the tape has a nominal width and is oriented about parallel with the intended direction of tape travel 1501. As shown, the readers 1504 are aligned with the data tracks 1506 on the tape 1502. However, FIG. 15B shows the effect of skew. As the tape 1502 is skewed, it shifts from an orientation about parallel with the intended direction of tape travel 1501 (e.g., as shown in FIG. 15A), to being oriented at a skewed angle $\theta_{skew}$ relative to the intended direction of tape travel 1501. As shown, the readers 1504 are now positioned along the boundary between the data tracks 1506. Depending on the extent and/or direction of skew, the extent of misalignment between the readers and their corresponding data tracks may vary. Moreover, it should be noted that the exaggerated extent of the tape skew illustrated in FIG. 15B is presented for by way of example only.

In various approaches, tape skew may be compensated for by laterally moving the array of transducers and/or tilting the array of transducers relative to the longitudinal axis of the array, thereby selectively altering the location of the transducers in the array relative to the tape. Such tilting is preferably effected by rotating the array, but pivoting may also be employed in some approaches.

In one approach to compensate for tape skew, the head may be moved orthogonal to an intended direction of tape travel in order to realign the transducers with the skewed data tracks. Smaller adjustments may be made to keep the project reader span aligned with tracks on the tape. Looking momentarily to FIG. 15C, the head 1500 has been moved (e.g., shifted) orthogonal to the intended direction of tape travel 1501 in order to realign the readers 1504 with the skewed data tracks 1506.

In another approach to compensate for tape skew, the head may be tilted to position the longitudinal axis of the array of transducers approximately orthogonal to the actual direction of tape travel 1503 in order to realign the transducers with the skewed data tracks. Smaller adjustments may be made to keep the project reader span aligned with tracks on the tape. Looking momentarily to FIG. 15D, the head 1500 has been moved (e.g., tilted) orthogonal to the actual direction of tape travel 1503 in order to realign the readers 1504 with the skewed data tracks 1506.

This process of shifting and/or tilting of the head to realign the transducers with the skewed data tracks is effective when only one module is used (one row of elements). However, magnetic tape systems generally have two or more modules, each containing a row of transducers, where the additional rows of transducers allow for read verify during the write process. One difficulty in implementing this scheme in a head having multiple arrays, such as for the head in FIGS. 2, 2C and 3-7, is that though one array of transducers may be properly aligned with the tracks, the other arrays of transducers may not. Conventional products having more than one module implement a bonding process to fix the modules relative to each other. Currently, this bonding process creates a single movable sub assembly that is attached to a track following actuator typically motivated by a voice coil system. In other words, when the lateral orientation is changed for two or more modules that are fixed relative to each other, it is not possible to keep all elements on track since the other rows of elements will move as well.

Figure 16B:
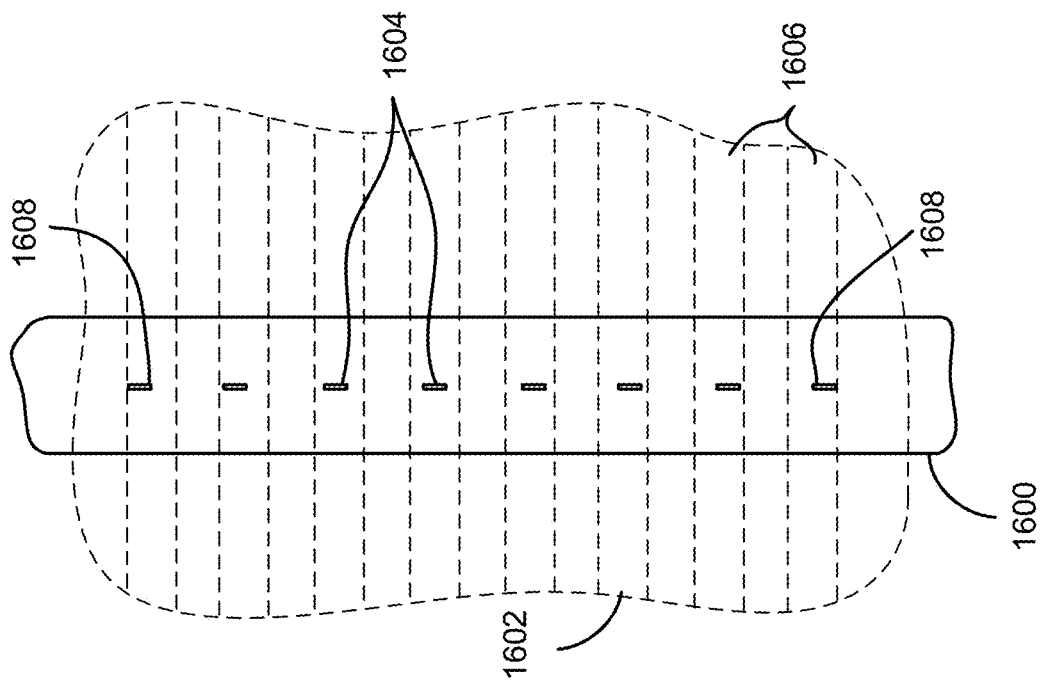
FIGS. 16A-16C illustrate the effect of tape lateral expansion and contraction.
Figure 16A:
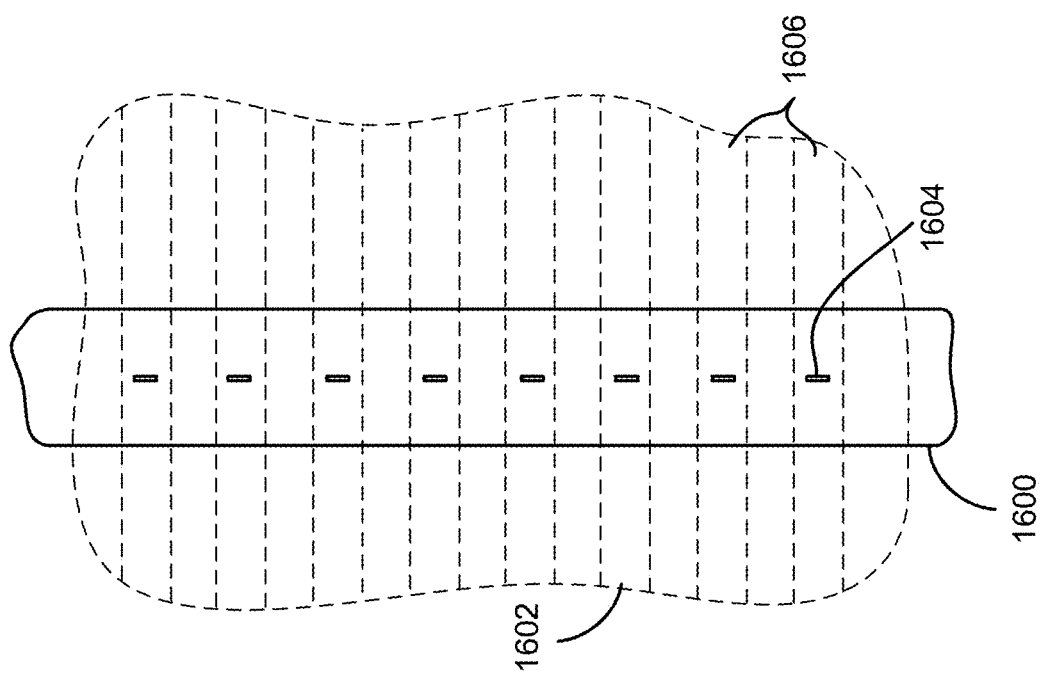
Figure 16C:
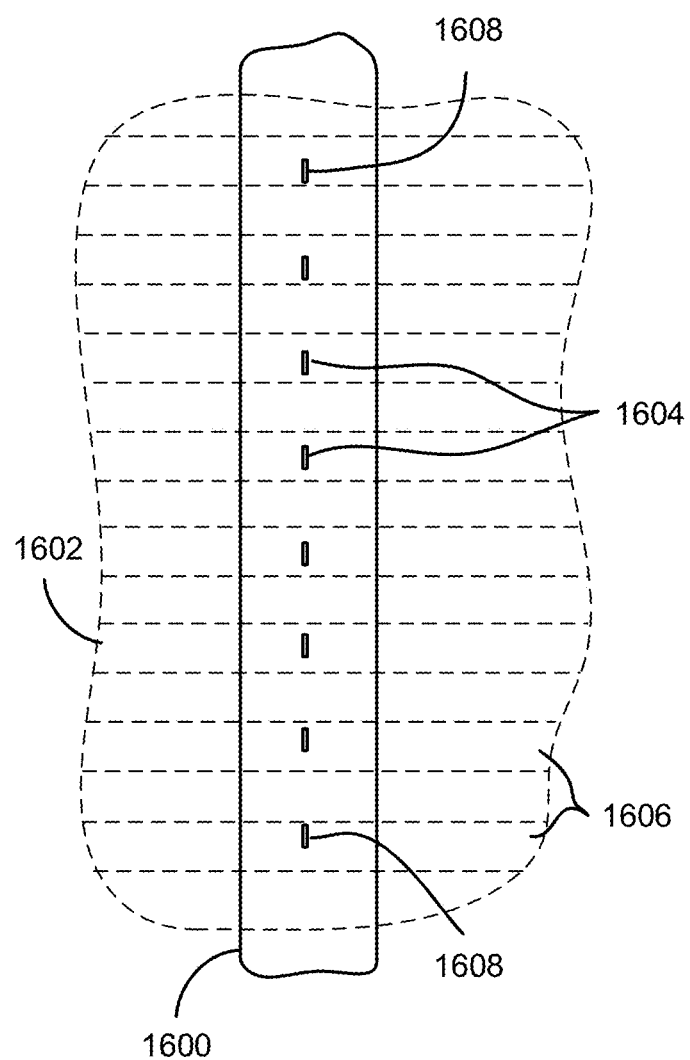

FIGS. 16A-16C represent the effect of TDS, namely tape lateral expansion and contraction, on reader position relative to the tape. FIG. 16A shows a head 1600 relative to the tape 1602, where the tape has a nominal width. As shown, the readers 1604 are aligned with the data tracks 1606 on the tape 1602. FIG. 16B shows the effect of tape lateral contraction. As shown, the outermost readers 1608 are positioned along the outer edges of the outer data tracks. FIG. 16C shows the effect of tape lateral expansion. As shown, the outermost readers 1608 are positioned along the inner edges of the outer data tracks. Because all of the readers 1604 have the same width, the readback signal level from each reader will normally be the same.

Various aspects of the present invention described below enable compensation for both skew and TDS changes. In one aspect, an apparatus includes a head assembly that incorporates a skew detector portion and an actuation mechanism that enables tape skew following, track following, and adjustments for TDS compensation. The actuation mechanism in some approaches has multiple actuators, e.g., one actuator for skew following and a second actuator for track following and TDS compensation. This new apparatus solves the aforementioned problems by enabling more accurate placement of tracks regardless of tape skew or TDS, and thus enables higher track density and growth in cartridge capacity. In some approaches, a new servo-skew pattern is used with the skew detector portion. In other approaches, the skew detector portion functions using conventional TBS patterns.

FIGS. 17A-17C illustrate, with reference to a system 1700, the concept of using skew detection transducers to detect vertical bars in a new servo-skew pattern for skew following. As an option, the present system 1700 may be implemented in conjunction with features from any other approach listed herein, such as those described with reference to the other FIGS., such as FIG. 1A. However, such system 1700 and others presented herein may be used in various applications and/or in permutations which may or may not be specifically described in the illustrative approaches listed herein. Further, the system 1700 presented herein may be used in any desired environment. Thus FIGS. 17A-17C (and the other FIGS.) may be deemed to include any possible permutation.

As shown, skew detection transducers 1702 are positioned over servo-skew patterns of a magnetic recording tape 1703. These skew detection transducers 1702 may be positioned adjacent the same data band on tape, but could also be positioned several data bands apart to enhance skew detection. An array of two skew detection transducers 1702 is shown. Moreover, some approaches may have more than two skew detection transducers 1702, such as one skew detection transducer 1702 per servo band, one skew detection transducer 1702 for positioning over every other servo band, or any configuration.

Each servo-skew pattern has vertical bars 1704 therealong, where vertical in FIGS. 17A-17C refers to perpendicular to the longitudinal axis of the tape 1703 extending between distal ends of the tape. The vertical bars 1704 are preferably positioned along an entire length of the tape 1703, but could be present on one or more portions thereof. The vertical orientation of the vertical bars makes them virtually immune to the effects of tape lateral expansion or contraction, as well as the effects of head expansion and differences in transducer pitch from head to head. Accordingly, the span between the skew detection transducers 1702 is not critical (as it would be for timing-based servo-based positioning).

Preferably, the skew detection transducers 1702 are wider than the TBS servo transducers in the apparatus. TBS servo transducers are generally as narrow as possible to improve accuracy when reading the angled bars of the chevrons. Vertical bars provide an advantage in that dedicated skew detection transducers may be wider since the angle between the vertical bars and the longitudinal axis of the skew detection transducers is 0 degrees. Use of a wider transducer improves the signal to noise ratio (SNR), which improves detection. However, the skew detection transducers may have a similar width as the TBS servo transducers, in various approaches.

In FIG. 17A, the tape is not skewed and the longitudinal axis of the array of skew detection transducers 1702 is oriented perpendicular to the actual direction of tape travel 1706 thereacross.

In FIG. 17B, the longitudinal axis of the tape is skewed to an extent St greater or less than 90° from the longitudinal axis of the array of skew detection transducers 1702. The skew detector portion of the system 1700 detects the skew based on readback signals from the skew detection transducers 1702. In this case, assuming the tape 1703 is moving right to left, the lower skew detection transducer 1702 detects the lower bars 1704 before the upper skew detection transducer 1702 detects the upper bars. From the delay between detections and any other relevant factors such as tape speed, a correction factor such as the angle of skew can be calculated using known techniques.

The calculated correction factor is then used to positioning the orientation of the longitudinal axis of the array of skew detection transducers 1702 substantially orthogonal ($\delta t \approx 90°$) to the actual direction of tape travel across the array of skew detection transducers, as shown in FIG. 17C. The array of skew detection transducers 1702 may pivot about any desired pivot point 1710; however, the preferred pivot point 1710 is one along the longitudinal axis 1814 of the array of skew detection transducers 1702 and located so as to minimize associated translations.

FIG. 18 depicts an apparatus 1800 in accordance with one approach. As an option, the present apparatus 1800 may be implemented in conjunction with features from any other approach listed herein, such as those described with reference to the other FIGS., such as FIG. 1A. However, such apparatus 1800 and others presented herein may be used in various applications and/or in permutations which may or may not be specifically described in the illustrative approaches listed herein. Further, the apparatus 1800 presented herein may be used in any desired environment. Thus FIG. 18 (and the other FIGS.) may be deemed to include any possible permutation.

The apparatus 1800 includes an array of skew detection transducers 1702, e.g., such as the array described above with reference to FIGS. 17A-17C. With reference to FIGS. 17A-18, the array of skew detection transducers 1702 may have a longitudinal axis nominally oriented at a predefined angle relative to an intended direction of tape travel thereacross when in use. Preferably, that predefined angle results in the longitudinal axis being maintained substantially orthogonal to the actual direction of tape travel thereacross, as shown in FIGS. 17A-17C. This orientation results in virtually no misregistration or distortion as a result of tape lateral expansion or contraction, because the orientation of the array of skew detection transducers is parallel to the direction of tape lateral expansion or contraction. Moreover, this orientation renders the array of skew detection transducers immune to pitch variations between the skew detection transducers.

Referring again to FIG. 18, the skew detection transducers 1702 reside on a module 1802 that is separate from the data transducer module(s) 1804. However, the skew detection transducers 1702 may reside on the same module as the data transducers.

The number of skew detection transducers 1702 on the module 1802 may be as few as two, and up to a number higher than the number of servo bands on the tape for which the apparatus 1800 was designed. For example, where two skew detection transducers 1702 are present, the skew detection transducers 1702 may be positioned to flank a single data band. However, more preferably, the skew detection transducers 1702 are spread farther apart than one data band so that the effects of tape skew presented to the skew detection transducers 1702 is more pronounced.

In particularly preferred approaches, more than two skew detection transducers 1702 are present on the module 1802. In one approach, the number of skew detection transducers 1702 is equal to the number of servo bands on the tape for which the apparatus 1800 was designed. In a preferred approach, the number of skew detection transducers 1702 is sufficient to ensure that at least two of the skew detection transducers 1702 are positioned over outermost servo bands regardless of the data band over which the data transducers are positioned. FIG. 19 depicts such an approach, where common elements share common numbering with the system of FIGS. 17-18. As shown in FIG. 19, the tape 1703 has five servo bands 1902, each servo band having a servo track readable by a skew detection transducer 1702. The module 1802 has eight skew detection transducers 1702. As the module 1802 is indexed across the tape to position the data transducers (not shown) over the data bands, as depicted by the module 1802 shown in shadow, a skew detection transducer 1702 is always positioned over at least the outermost servo bands 1902, and in the example shown, skew detection transducers 1702 are positioned over all servo bands 1902 after each translation of the module 1802.

The data transducers include read and/or write transducers, in any combination. As shown in FIG. 18, the data transducers are on three modules 1804. In other approaches, the data transducers may reside on 1, 2, 4, etc. modules 1804. For context, assume each outer data transducer module 1804 has an array of write transducers 1806, and an array of read transducers 1808 of the middle data transducer module 1804 is aligned with the array of write transducers 1806 in the intended direction of tape travel 1810 thereacross. The data transducers 1806, 1808 are thus spaced from the array of skew detection transducers along the intended direction of tape travel 1810. Note that the array of skew detection transducers 1702 may be located on any side of the array(s) of data transducers. Moreover, there may be more than one array of skew detection transducers 1702, e.g., for respective use when the tape is traveling in opposite directions. In the approach shown, the array of skew detection transducers 1702 is nominally oriented substantially orthogonal to an intended direction of tape travel thereacross when in use.

A first actuator 1812 is configured to operatively exert a force on the array of skew detection transducers 1702 for orienting a longitudinal axis 1814 of the array of skew detection transducers substantially orthogonal to the actual direction of tape travel across the array of skew detection transducers 1702, thereby compensating for tape skew. The array of skew detection transducers 1702 may pivot about any desired pivot point 1710; however, the preferred pivot point 1710 is one along the longitudinal axis 1814 of the array of skew detection transducers 1702.

FIG. 20 illustrates an approach where the longitudinal axes of the arrays of read and write transducers 1806, 1808 shown in FIG. 18 are not pivotable from an orientation thereof relative to the longitudinal axis of the array of skew detection transducers 1702. For example, the modules 1802, 1804 may be bonded together. Accordingly, the first actuator 1812 is configured to move the first and the at least one second module together. Note that the first actuator may include a mechanism for track following, and/or a track following actuator may be present for adjusting a lateral position of the data arrays, e.g., based on TBS servo patterns configured for enabling such positioning. As shown in FIG. 20, upon detection of tape skew, the arrays are rotated by the first actuator to follow the tape skew.

In a preferred approach, one or more, and preferably all, of the data transducer modules 1804 are movable relative to the module 1802 having the skew detection transducers 1702. Referring to FIG. 21, which shares common numbering for common elements with FIG. 18, the first actuator 1812 is configured to move the modules 1802, 1804 together for skew following. A second actuator 2102 is configured to exert a force on one or more of the data transducer modules 1804 for causing a relative movement of the data transducer modules 1804 with respect to module 1802 for adjusting a tilt angle of the data transducer modules 1804 relative to the longitudinal axis of the array of skew detection transducers in response to a determined state of lateral expansion of the tape. The second actuator 2102 may also provide positioning of data transducer modules 1804 for track following using the TBS servo pattern.

Figure 23:
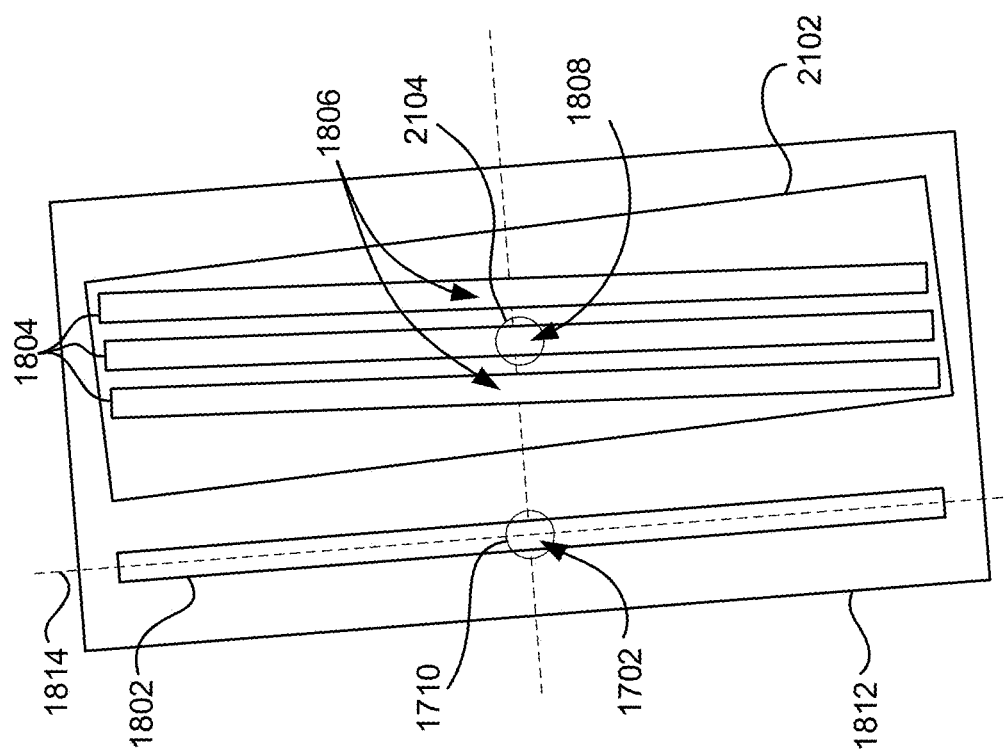
FIG. 23 depicts the apparatus of FIG. 21 with skew correction and TDS compensation applied.

FIG. 21 depicts exemplary relative orientations of the components shown when the tape is not skewed and the tape is not expanded or contracted. FIG. 22 depicts exemplary relative orientations of the components shown in FIG. 21 when the tape is not skewed but the tape is contracted. FIG. 23 depicts exemplary relative orientations of the components shown in FIG. 21 when the tape is skewed and the tape is expanded.

Note that the state of lateral expansion of the tape generally refers to a state of expansion or contraction of the tape. For example, the state of lateral expansion may be measured, e.g., by the servo track following system using conventional techniques. Such measurement may be referenced against some nominal state, e.g., the state of the tape when the tracks being read were written, a state specified in a standard, etc. Other types of positioning such as track following can be provided by either actuator. For example, the second actuator may also be configured to provide track following to the modules 1804.

Note also that the actuators 1812, 2102 described herein may be of conventional design. For example, one or both actuators may include a piezo actuator, worm screw actuator, etc. Moreover, any of the actuators 1812, 2102 may provide more than one type of actuation, e.g., skew following, lateral positioning for track following and/or tilting for TDS correction. The separation of actuation function provides a vast improvement over currently-known solutions, especially the marriage of skew compensation and TDS compensation.

The array of skew detection transducers 1702 may pivot about any desired pivot point 1710; however, the preferred pivot point 1710 is one along the longitudinal axis 1814 of the array of skew detection transducers 1702. Likewise, the data transducer modules 1804 may pivot about any desired pivot point 2104, though the preferred pivot point 2104 is one centered with respect to the data transducers.

In preferred approaches, the longitudinal axes of the arrays of read and write transducers 1806, 1808 are nominally tilted by greater than 0° from the longitudinal axis of the array of skew detection transducers 1702, as shown in FIGS. 21-22. However, in other approaches, the longitudinal axes of the arrays of read and write transducers 1806, 1808 are parallel to the longitudinal axis of the array of skew detection transducers 1702, as shown in FIGS. 18 and 20.

Referring to the apparatus shown in FIG. 1A, which may be used in combination with any or all of the features of FIG. 18 and FIGS. 21-22, a controller 128 is preferably coupled to the skew detection transducers 1702 and actuator(s) 1812, 2102 (actuators collectively shown as 132 in FIG. 1A). In one approach, the controller 128 is configured to control the first actuator 1812 to compensate for tape skew based on readback signals from the skew detection transducers, and if present, the second actuator 2102 for TDS compensation.

The controller may also be configured to control actuation of the arrays of read and write transducers for track following based on a readback signal from the servo readers, in a conventional manner. To that end, conventional servo readers may flank the array of write transducers and/or the array of read transducers for reading conventional servo tracks, e.g., TBS and/or HD servo tracks.

Figure 24:
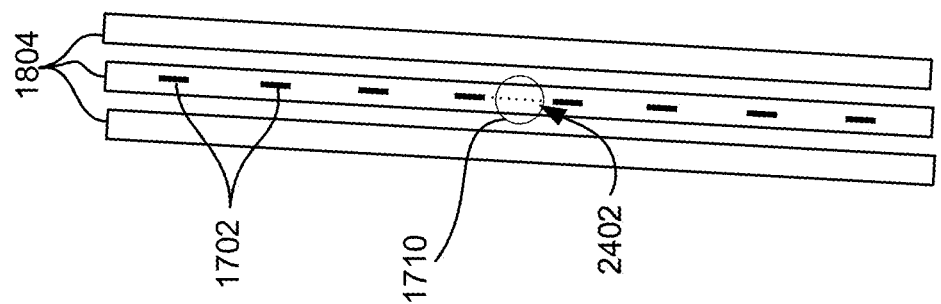
FIG. 24 illustrates an apparatus, in accordance with one approach.

FIG. 24 depicts an apparatus 2400 in accordance with one approach. As an option, the present apparatus 2400 may be implemented in conjunction with features from any other approach listed herein, such as those described with reference to the other FIGS., such as FIG. 1A. However, such apparatus 2400 and others presented herein may be used in various applications and/or in permutations which may or may not be specifically described in the illustrative approaches listed herein. Further, the apparatus 2400 presented herein may be used in any desired environment. Thus FIG. 24 (and the other FIGS.) may be deemed to include any possible permutation.

The apparatus 2400 includes an array of skew detection transducers 1702, e.g., such as the array described above with reference to FIGS. 17A-17C, but the skew detection transducers 1702 are on one or more of the data modules. Accordingly, a separate module for skew detection is not present. With reference to FIG. 24, the array of skew detection transducers 1702 may be aligned along the longitudinal axis of the module 1804 and/or data transducers 2402. Preferably, the number of skew detection transducers 1702 is such that at least two of the skew detection transducers 1702 are positioned over outermost servo bands regardless of the data band over which the data transducers are positioned, e.g., in a manner similar to that of FIG. 19.

Referring again to FIG. 18, the skew detection transducers 1702 reside on a module 1802 that is separate from the data transducer module(s) 1804. However, the skew detection transducers 1702 reside on the same module as the data transducers.

The number of skew detection transducers 1702 on the module 1802 may be as few as two, and up to a number higher than the number of servo bands on the tape for which the apparatus 1800 was designed. For example, where two skew detection transducers 1702 are present, the skew detection transducers 1702 may be positioned to flank a single data band. However, more preferably, the skew detection transducers 1702 are spread farther apart than one data band so that the effects of tape skew presented to the skew detection transducers 1702 is more pronounced.

Where vertical bars 1704 (FIG. 17A) are read using the skew detection transducers 1702, the controller may be configured to compute a skew correction value based on the readback signals from the skew detection transducers reading the vertical bars.

The vertical bars may be present on a magnetic recording tape in any desired configuration, e.g., in any desired servo track and in frames of any number of vertical bars, e.g., 2, 3, 4, or more vertical bars. In some approaches, vertical bars are present in a TBS pattern, e.g., between each frame of chevron patterns (or equivalently N patterns, W patterns, etc.), between a selected number of frames of chevron patterns (e.g., between groups of 3 frames, groups of 5 frames, etc.), etc.

In preferred approaches, the vertical bars for skew detection are present above and/or below a TBS pattern.

Figure 25B:
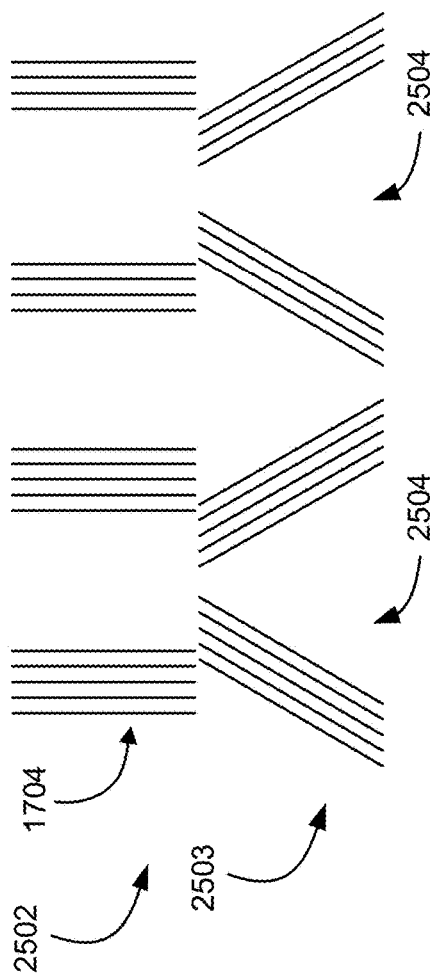
FIG. 25B illustrates a frame of an inventive servo-skew pattern written using the writer of FIG. 25A.
Figure 25D:
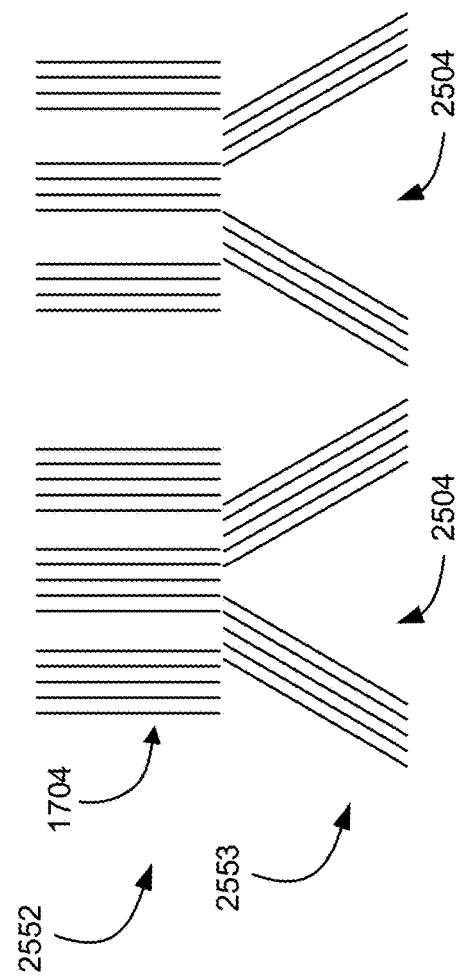
FIG. 25D illustrates a frame of an inventive servo-skew pattern written using the writer of FIG. 25C.
Figure 25A:
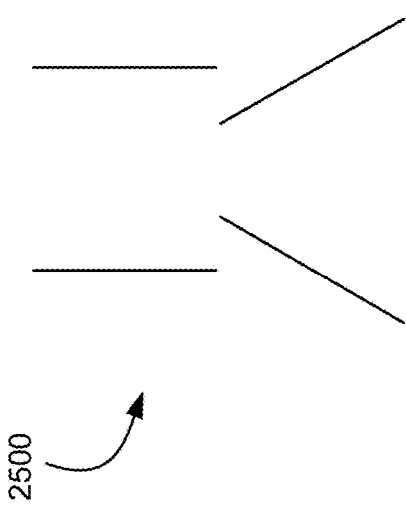
FIG. 25A is a conceptual diagram of a writer for writing an inventive servo-skew pattern, in accordance with one aspect of the present invention.

FIG. 25A depicts a writer 2500 for writing an inventive servo-skew pattern according to one aspect of the present invention. FIG. 25B illustrates a frame of an inventive servo-skew pattern 2502 written using the writer 2500. As shown, vertical bars 1704 are present above a TBS servo pattern 2503 having chevrons 2504. In this case, a skew detection transducer is alignable with the track of vertical bars 1704 while a TBS servo transducer, e.g., of the data modules, is alignable with the chevrons 2504 for track following.

Figure 25C:
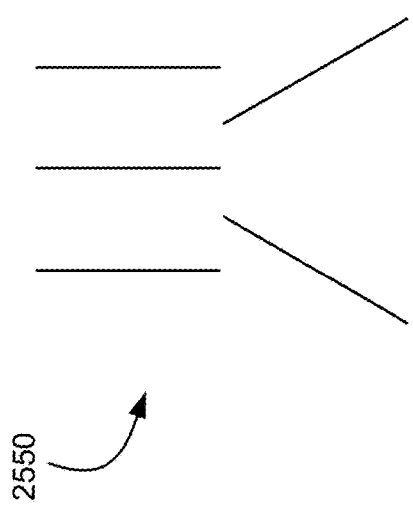
FIG. 25C is a conceptual diagram of a writer for writing an inventive servo-skew pattern, in accordance with one aspect of the present invention.

FIG. 25C depicts another example of a writer 2550 for writing an inventive servo-skew pattern according to one aspect of the present invention. FIG. 25D illustrates a frame of the inventive servo-skew pattern 2552 according to one aspect of the present invention. As shown, vertical bars 1704 are present above a timing-based servo pattern 2553 having chevrons 2504. In this case, a skew detection transducer is alignable with the track of vertical bars 1704 while a TBS servo transducer, e.g., of the data modules, is alignable with the chevrons 2504 for track following.

FIG. 25E depicts another example of a writer 2570 for writing an inventive servo-skew pattern according to one aspect of the present invention. In this case, the write portion that writes the vertical bars is independently addressable from the portion that writes the TBS pattern. FIG. 25F illustrates a frame of the inventive servo-skew pattern 2572 according to one aspect of the present invention. As shown, vertical bars 1704 are present above the timing-based servo pattern 2573 having chevrons 2504. In this case, a skew detection transducer is alignable with the track of vertical bars 1704 while a TBS servo transducer, e.g., of the data modules, is alignable with the chevrons 2504 for track following.

In other aspects, the vertical bars 1704 are shorter to minimize the space on tape required for the vertical bars 1704. The layout of the vertical bars can have any desired configuration, e.g., such as any of the arrangements shown in FIGS. 25B, 25D and 25F. FIG. 26 illustrates as example of an approach that is a variant of the pattern 2572 of FIG. 25F. In the servo-skew pattern 2602 of FIG. 26, the vertical bars 1704 are shorter to minimize the space on tape required for the vertical bars 1704. To ensure skew detection transducers are always over the shorter vertical bars 1704, the skew module may have sets of skew detection transducers, where the pitch between skew detection transducers in each set is less than the length of the vertical bars 1704.

Figure 27:
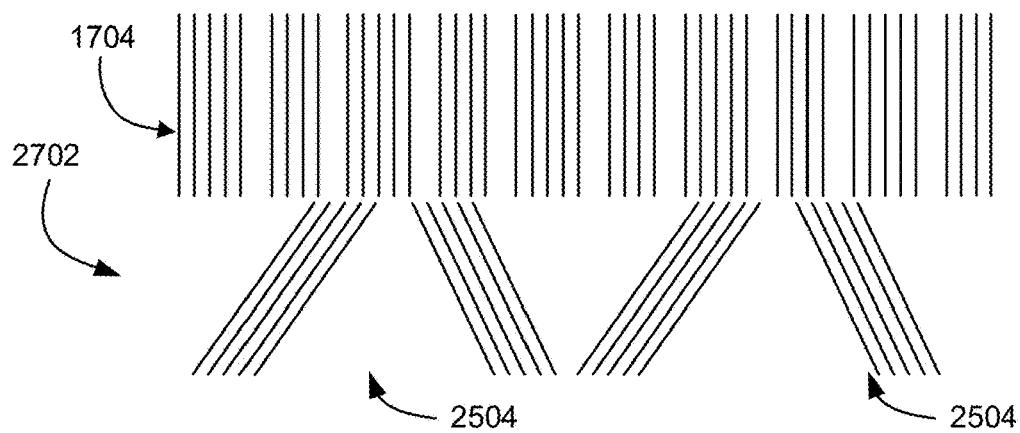
FIG. 27 illustrates an exemplary servo-skew pattern with vertical bars for skew detection, in accordance with one approach.

FIG. 27 depicts yet another variant 2702 where the angled bars making up the chevrons are angled for reading by TBS servo transducers of a tilted data module.

Figure 28:
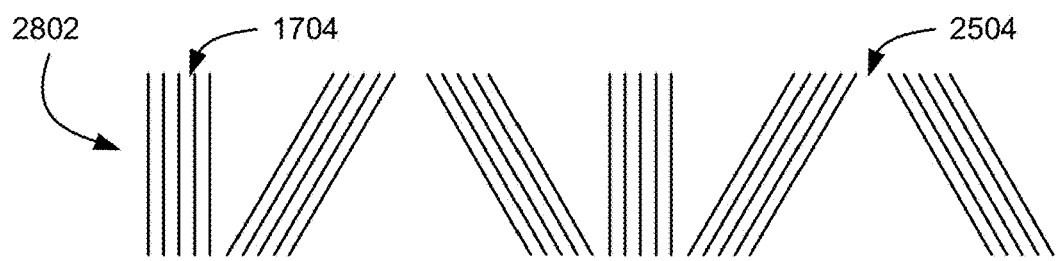
FIG. 28 illustrates an exemplary TBS pattern with vertical bars for skew detection, in accordance with one approach.
Figure 29:
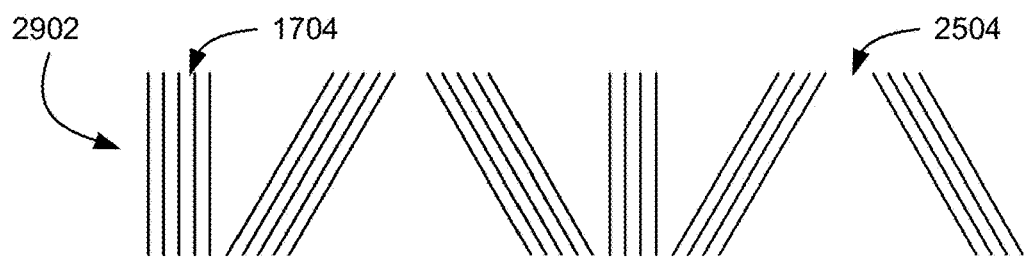
FIG. 29 illustrates an exemplary TBS pattern with vertical bars for skew detection, in accordance with one approach.
Figure 30:
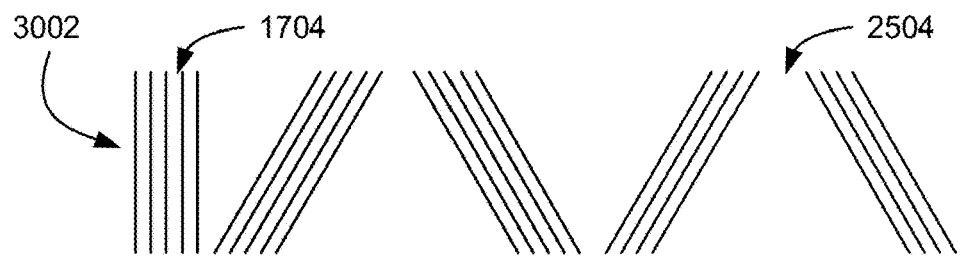
FIG. 30 illustrates an exemplary TBS pattern with vertical bars for skew detection, in accordance with one approach.

In further approaches, the vertical bars may be present in a known servo pattern having vertical bars, and such patterns are thereby deemed servo-skew patterns. Accordingly, various aspects of the present invention may be functional with existing tape media. As illustrated in FIG. 28, the vertical bars 1704 are present in a timing-based servo pattern 2802 having chevrons 2504 and the vertical bars 1704. FIG. 29 illustrates another example 2902 having sets of 5 and 4 vertical bars 1704 and chevrons 2504. FIG. 30 illustrates another example 3002 having a single set of vertical bars 1704 with a frame of 5 and 4 chevrons 2504. The output of the skew detection transducers corresponding to the vertical bars is usable for skew correction.

Note that other embedded information such as linear position (LPOS) dithering may be present in the servo-skew pattern, in various approaches. Moreover, an apparatus in one approach is configured to only use information about the vertical bars for skew correction.

In yet another approach, the controller is configured to compute a skew correction value based on the readback signals from the skew detection transducers reading chevrons of a timing-based servo pattern. The servo patterns may or may not have vertical bars. In such approach, a calculation may be made to essentially identify points corresponding to midpoints (or other calculable points) between the relevant bars of the upper and lower chevron patterns. Conceptually, an imaginary line may be generated between these two locations. The imaginary line may be perpendicular to the actual direction of tape travel thereacross, and the longitudinal axis of the array of skew detection transducers is made parallel to the imaginary line using the first actuator.

In a further approach, the array of two or more skew detection transducers may be present on a module that does not tilt. Rather, the signals from the skew detection transducers are used to determine tape skew, and used to cause the arrays of data transducers to tilt to correct for tape skew.

There have thus been described various aspects of the present invention that are able to overcome the effects of tape skew on magnetic heads, as well as compensate for TDS changes, by introducing improved ways of generating fine motion (e.g., micro motion) to control orientations of a module relative to the tape and/or one or more other modules in a magnetic head.

In use, an apparatus according to any approach described herein performs the functions inferred by the foregoing descriptions.

Figure 31:
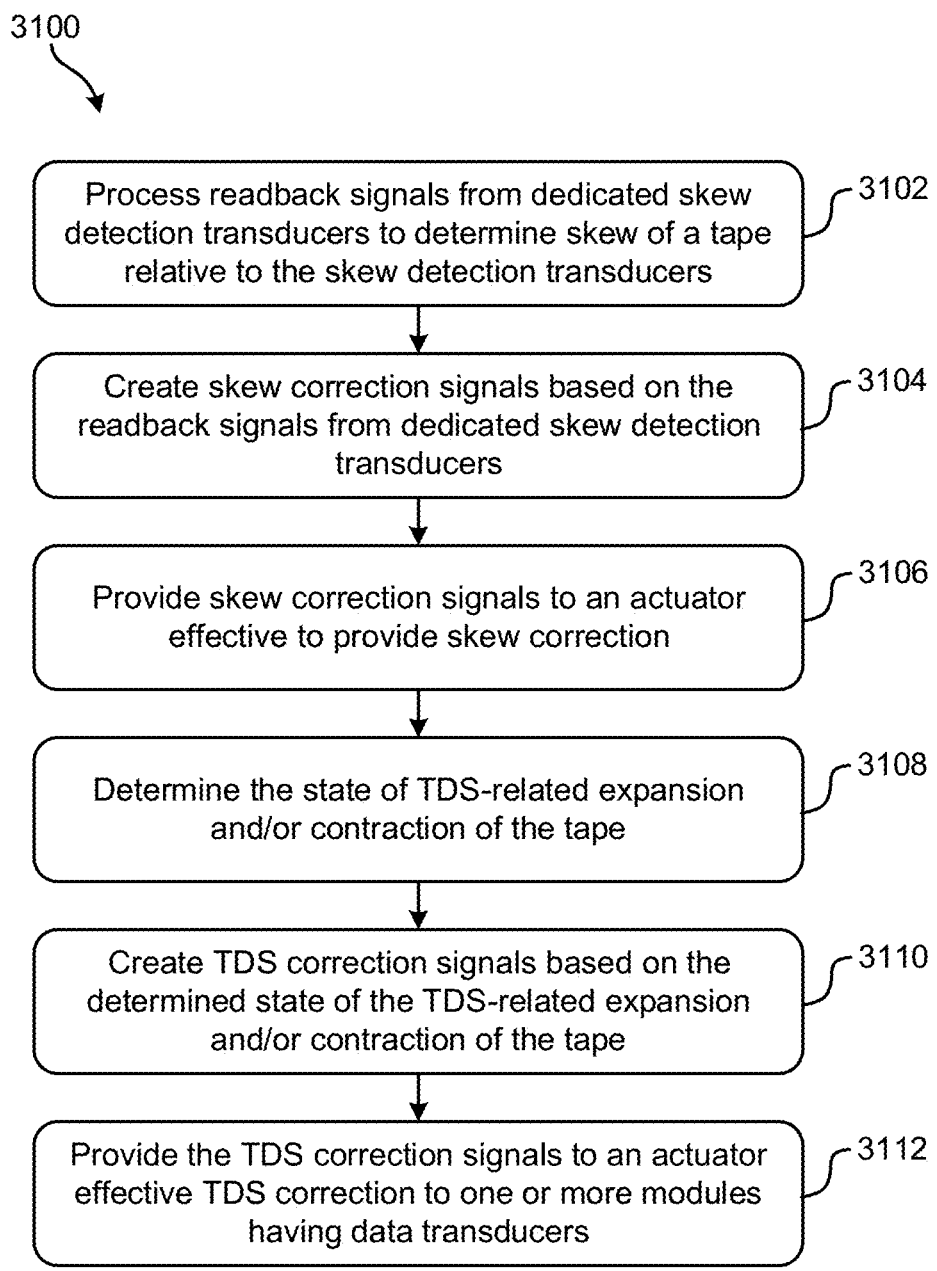
FIG. 31 is a flowchart of a method, in accordance with one approach.

Now referring to FIG. 31, a flowchart of a method 3100 is shown according to one approach. The method 3100 may be performed in accordance with the present invention in any of the environments depicted in FIGS. 1A-30, among others, in various approaches. Of course, more or fewer operations than those specifically described in FIG. 31 may be included in method 3100, as would be understood by one of skill in the art upon reading the present descriptions.

Each of the steps of the method 3100 may be performed by any suitable component of the operating environment using known techniques and/or techniques that would become readily apparent to one skilled in the art upon reading the present disclosure. For example, in various approaches, the method 3100 may be partially or entirely performed by any apparatus described herein, or some other device having one or more processors therein. The processor, e.g., processing circuit(s), chip(s), and/or module(s) implemented in hardware and/or software, and preferably having at least one hardware component may be utilized in any device to perform one or more steps of the method 3100. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 31, method 3100 includes operation 3102, where readback signals from dedicated skew detection transducers are processed to determine skew of a tape relative to the skew detection transducers. In operation 3104, skew correction signals are created based on the readback signals from dedicated skew detection transducers, and provided to an actuator effective to provide skew correction in operation 3106. In optional operations 3108, the state of TDS-related expansion and/or contraction of the tape is determined using known techniques, such as by reading TBS data from two different servo bands and calculating the extent of expansion or contraction. For example, using chevron-based TBS data, when the tape is perfect, the two servo signals should be virtually identical at a given lateral position. If the tape has contracted or expanded, the servo signals will be different, and this difference can be used to determine the extent of contraction or expansion using known techniques. In operations 3110 and 3112, TDS correction signals are created based on the determined state of the TDS-related expansion and/or contraction of the tape, and provided to an actuator effective to provide TDS correction to one or more modules having data transducers. This actuator is preferably a second actuator. The method 3100 may be performed during read operations and write operations. Additionally, other conventional processes may be performed, such as track following, read-while-write, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. An apparatus comprising:
    an array of skew detection transducers positioned to simultaneously read multiple servo bands defining data bands therebetween of a magnetic recording tape, wherein at least two of the skew detection transducers in the array are spaced apart by at least three data bands in a direction along a longitudinal axis of the array of skew detection transducers;
    an array of write transducers spaced from the array of skew detection transducers along an intended direction of tape travel thereacross, the write transducers being positioned to write a plurality of data tracks in one of the data bands defined between a pair of directly adjacent ones of the servo bands;
    an array of read transducers aligned with the array of write transducers in the intended direction of tape travel; and
    a first actuator configured to operatively exert a force on the array of skew detection transducers for orienting the longitudinal axis of the array of skew detection transducers orthogonal to an actual direction of tape travel across the array of skew detection transducers.

2. The apparatus as recited in claim 1, wherein the array of skew detection transducers is on a first module, wherein the arrays of read and write transducers are on at least one second module that is spaced from the first module.

3. The apparatus as recited in claim 2, wherein longitudinal axes of the arrays of read and write transducers are not pivotable from an orientation thereof relative to the longitudinal axis of the array of skew detection transducers, wherein the first actuator is configured to move the first module and the at least one second module together about a common pivot point.

4. The apparatus as recited in claim 2, wherein the at least one second module is movable relative to the first module, wherein the first actuator is configured to move the first and the at least one second module together; and comprising a second actuator configured to exert a force on the at least one second module for causing a relative movement of the at least one second module with respect to the first module for adjusting a tilt angle of the at least one second module in response to a determined state of lateral expansion of the tape.

5. The apparatus as recited in claim 1, wherein longitudinal axes of the arrays of read and write transducers are nominally tilted by greater than 0° from the longitudinal axis of the array of skew detection transducers.

6. The apparatus as recited in claim 1, comprising servo readers flanking the array of write transducers; and servo readers flanking the array of read transducers; and a controller configured to control actuation of the arrays of read and write transducers for track following based on a readback signal from the servo readers.

7. The apparatus as recited in claim 1, comprising a controller configured to compute a skew correction value based on readback signals from the skew detection transducers reading vertical bars of a timing-based servo pattern in one of the servo bands, the timing-based servo pattern having chevrons and the vertical bars.

8. The apparatus as recited in claim 1, comprising a controller configured to compute a skew correction value based on readback signals from the skew detection transducers reading chevrons of a timing-based servo pattern.

9. A data storage system, comprising
    the apparatus as recited in claim 1, the apparatus having a magnetic head having the arrays and
    a drive mechanism for passing the magnetic recording tape over the magnetic head.

10. An apparatus comprising:
    a first module having an array of skew detection transducers;
    an array of write transducers spaced from the array of skew detection transducers along an intended direction of tape travel thereacross;
    an array of read transducers aligned with the array of write transducers in the intended direction of tape travel, wherein the arrays of read and write transducers are on at least one second module, wherein the at least one second module is movable relative to the first module;
    a first actuator configured to move the first and the at least one second module together; and
    a second actuator configured to exert a force on the at least one second module for causing a relative movement of the at least one second module with respect to the first module for adjusting a tilt angle of the at least one second module in response to a determined state of lateral expansion of the tape.

11. The apparatus as recited in claim 10, wherein longitudinal axes of the arrays of read and write transducers are nominally tilted by greater than 0° from a longitudinal axis of the array of skew detection transducers.

12. The apparatus as recited in claim 10, comprising a controller configured to control the first actuator to compensate for tape skew based on readback signals from the skew detection transducers.

13. The apparatus as recited in claim 12, comprising servo readers flanking the array of write transducers; and servo readers flanking the array of read transducers, wherein the controller is configured to control actuation of the arrays of read and write transducers for track following based on a readback signal from the servo readers.

14. The apparatus as recited in claim 12, wherein the controller is configured to compute a skew correction value based on the readback signals from the skew detection transducers reading vertical bars of a timing-based servo pattern in a servo band, the timing-based servo pattern having chevrons and the vertical bars.

15. The apparatus as recited in claim 12, wherein the controller is configured to compute a skew correction value based on the readback signals from the skew detection transducers reading chevrons of a timing-based servo pattern.

16. An apparatus comprising:
a first module having an array of skew detection transducers thereon, the array having at least four skew detection transducers aligned along the module in a straight line and positioned to read at least three different servo tracks simultaneously;
an array of write transducers;
an array of read transducers aligned with the array of write transducers in an intended direction of tape travel; and
a first actuator configured to operatively exert a force on the array of skew detection transducers for adjusting an orientation of a longitudinal axis of the array of skew detection transducers relative to an actual direction of tape travel.

17. The apparatus as recited in claim 16, wherein longitudinal axes of the arrays of read and write transducers are parallel to the longitudinal axis of the array of skew detection transducers.

18. The apparatus as recited in claim 16, wherein the arrays of read and write transducers are on at least one second module that is spaced from the first module, wherein the at least one second module is movable relative to the first module, wherein the first actuator is configured to move the first and the at least one second module together; and comprising a second actuator configured to exert a force on the at least one second module for causing a relative movement of the at least one second module with respect to the first module for adjusting a tilt angle of the at least one second module in response to a determined state of lateral expansion of the tape.

19. The apparatus as recited in claim 18, comprising servo readers flanking the array of write transducers; and servo readers flanking the array of read transducers; and a controller configured to control actuation of the arrays of read and write transducers for track following based on a readback signal from the servo readers.

20. The apparatus as recited in claim 18, comprising a controller configured to compute a skew correction value based on readback signals from the skew detection transducers reading vertical bars of a timing-based servo pattern in a servo band, the timing-based servo pattern having chevrons and the vertical bars.

21. The apparatus as recited in claim 18, comprising a controller configured to compute a skew correction value based on readback signals from the skew detection transducers reading chevrons of a timing-based servo pattern.

22. An apparatus comprising:
a first module having an array of skew detection transducers positioned to simultaneously read multiple servo bands defining data bands therebetween of a magnetic recording tape, wherein at least two of the skew transducers in the array are spaced apart by at least three data bands in a direction along a longitudinal axis of the array of skew detection transducers;
an array of write transducers spaced from the array of skew detection transducers along an intended direction of tape travel thereacross;
an array of read transducers aligned with the array of write transducers in the intended direction of tape travel, wherein the arrays of read and write transducers are on at least one second module, the read transducers being positioned to read a plurality of data tracks in one of the data bands defined between a pair of directly adjacent ones of the servo bands; and
a first actuator configured to operatively exert a force on the array of skew detection transducers for maintaining an orientation of a longitudinal axis of the array of skew detection transducers substantially orthogonal to an actual direction of tape travel,
wherein longitudinal axes of the arrays of read and write transducers are not pivotable from an orientation thereof relative to the longitudinal axis of the array of skew detection transducers, wherein the first actuator is configured to move the first and the at least one second module together.

23. The apparatus as recited in claim 22, comprising a controller configured to control the first actuator to compensate for tape skew based on readback signals from the skew detection transducers.

24. The apparatus as recited in claim 23, comprising servo readers flanking the array of write transducers; and servo readers flanking the array of read transducers, wherein the controller is configured to control actuation of the arrays of read and write transducers for track following based on a readback signal from the servo readers.

25. The apparatus as recited in claim 23, wherein the controller is configured to compute a skew correction value based on the readback signals from the skew detection transducers reading a timing-based servo pattern.

* * * * *